(12) United States Patent
Otsuki

(10) Patent No.: US 6,698,954 B2
(45) Date of Patent: *Mar. 2, 2004

(54) PRINTING PROCESS USING A PLURALITY OF DRIVE SIGNAL TYPES

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/316,064

(22) Filed: Dec. 11, 2002

(65) Prior Publication Data

US 2003/0103102 A1 Jun. 5, 2003

Related U.S. Application Data

(63) Continuation of application No. 09/642,909, filed on Aug. 22, 2000, now Pat. No. 6,517,267.

(30) Foreign Application Priority Data

Aug. 23, 1999 (JP) .......................... 11-235156
Aug. 23, 1999 (JP) .......................... 11-235167

(51) Int. Cl.$^7$ .................................. B41J 2/22
(52) U.S. Cl. ..................... 400/124.01; 400/120.01
(58) Field of Search .................. 400/124.01, 120.01

(56) References Cited

U.S. PATENT DOCUMENTS

| | | | |
|---|---|---|---|
| 4,198,642 A | | 4/1980 | Gamblin |
| 4,468,140 A | * | 8/1984 | Harris ..................... 400/121 |
| 5,205,660 A | * | 4/1993 | Momose ................... 400/304 |
| 5,559,930 A | * | 9/1996 | Cariffe et al. ............. 395/102 |
| RE36,948 E | * | 11/2000 | McDonough et al. .. 400/124.01 |
| 6,190,001 B1 | * | 2/2001 | Saruta ....................... 347/41 |
| 6,196,736 B1 | * | 3/2001 | Otsuki et al. .......... 400/124.01 |
| 6,199,968 B1 | * | 3/2001 | Katahura et al. ............ 347/9 |
| 6,206,502 B1 | * | 3/2001 | Kato et al. ................. 347/41 |
| 6,494,554 B1 | * | 12/2002 | Horii et al. ................ 347/10 |
| 6,494,555 B1 | * | 12/2002 | Ishikawa .................... 347/10 |
| 6,517,267 B1 | * | 2/2003 | Otsuki ................... 400/124.01 |
| 2003/0025744 A1 | * | 2/2003 | Nou .......................... 347/10 |
| 2003/0103102 A1 | * | 6/2003 | Otsuki ....................... 347/41 |

FOREIGN PATENT DOCUMENTS

| | | | |
|---|---|---|---|
| EP | 0 737 586 | 10/1996 | |
| EP | 0 738 598 | 10/1996 | |
| EP | 0925927 A2 | * 6/1999 | ............. B41J/2/05 |
| EP | 0 930 164 | 7/1999 | |
| EP | 0 933 218 | 8/1999 | |
| EP | 0 936 573 | 8/1999 | |
| JP | 8-058083 | 3/1996 | |
| JP | 9-300600 | 11/1997 | |
| JP | 10193587 A | * 7/1998 | ............. B41J/2/01 |
| JP | 11078005 A | * 3/1999 | ............. B41J/2/045 |

OTHER PUBLICATIONS

Computer Translation of JP 11–078005.*
Computer Translation of JP 10–193587.*

* cited by examiner

*Primary Examiner*—Charles H. Nolan, Jr.
(74) *Attorney, Agent, or Firm*—Oblon, Spivak, McClelland, Maier & Neustadt, P.C.

(57) ABSTRACT

A maskable drive signal generator selectively generates one of n types of maskable drive signals for each main scan pass, and a drive signal masking section generates a drive signal to be supplied to ink-expulsion drive elements of a print head by masking the maskable drive signal according to a print signal. The printing of ink dots on each raster line is completed in n×m main scan passes while employing each of the n types of maskable drive signals m times on each raster line.

30 Claims, 24 Drawing Sheets

HEAD DRIVER 63

MULTI-SHOT DOTS

VARIABLE DOTS

Fig. 12
CONCOMITANT USE OF MULTI-SHOT DOTS AND VARIABLE DOTS
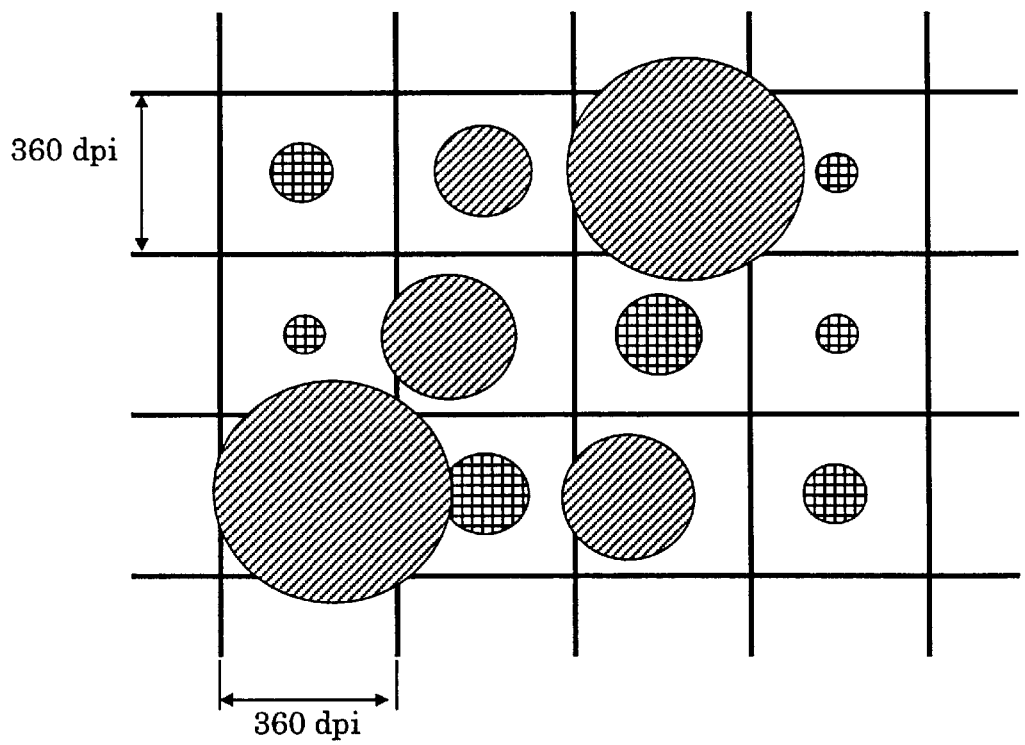
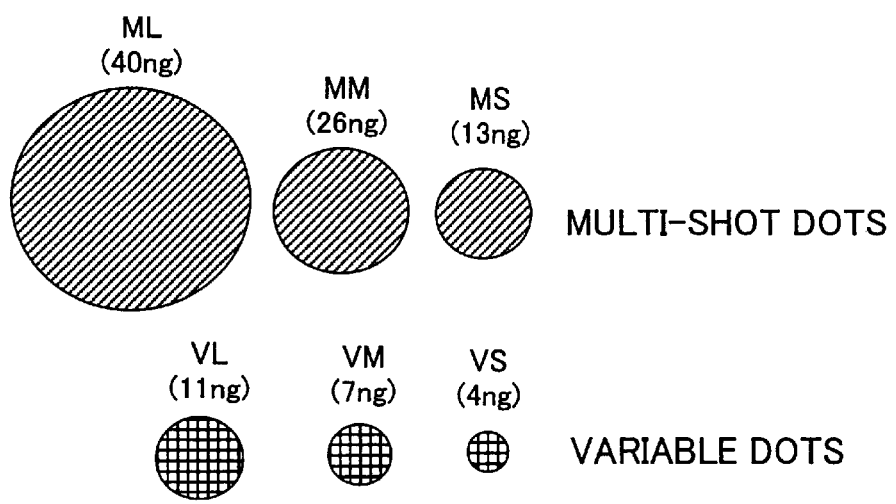

Fig. 17

SCAN PARAMETERS FOR MEDIAL PRINTING

NOZZLE PITCH: k=3 [dot]
NUMBER OF WORKING NOZZLES: N=46
SCAN ITERATION COUNT: s=2 (OVERLAID OVERLAP SCHEME)
EFFECTIVE NUMBER OF NOZZLES: Neff=23

| PASS NUMBER | 1 | 2 | 3 | 4 | 5 | 6 | 7 |
|---|---|---|---|---|---|---|---|
| DRIVE WAVEFORM | M | V | M | V | M | V | M |
| FORWARD/REVERSE | F | R | F | R | F | R | F |
| FEED L[dot] | 0 | 23 | 23 | 23 | 23 | 23 | 23 |
| $\Sigma L$ | 0 | 23 | 46 | 69 | 92 | 115 | 138 |
| $F=(\Sigma L)\%k$ | 0 | 2 | 1 | 0 | 2 | 1 | 0 |

DRIVE WAVEFORM M: MULTI-SHOT DOT WAVEFORM
DRIVE WAVEFORM V: VARIABLE DOT WAVEFORM

SCAN PARAMETERS FOR MEDIAL PRINTING

US 6,698,954 B2

PRINTING PROCESS USING A PLURALITY OF DRIVE SIGNAL TYPES

BACKGROUND OF THE INVENTION

1. Field of the Invention

The present invention relates to a technique for printing through emission of ink droplets.

2. Description of the Related Art

In recent years, ink-jet printers, which emit ink onto a print medium from a print head, have come to enjoy widespread use as output devices for computers. While conventional ink-jet printers can only reproduce pixels in binary fashion (ON or OFF), multilevel printers that can reproduce pixels with three or more levels have been proposed more recently. Multilevel pixels can be reproduced, for example, by manipulating the size of the dots formed at pixel locations.

Producing dots of different sizes requires providing to the drive elements of the print head drive signals of complex waveforms. In actual practice, it is difficult to generate drive signals having appropriate waveforms for producing dots of the desired size. Even where a printing device uses only one dot size, it is difficult in certain instances to generate a drive signal having an appropriate waveform for producing dots of the proper size.

Further, in order to increase the printable area of a print medium, printing is sometimes performed using a different printing scheme for the top edge and bottom edge portions of the medium than is used in the medial area of the print medium. In such cases, the printing scheme employed for the top edge and bottom edge portion of the medium will ideally be conformable to the printing scheme employed for the medial area of the print medium.

SUMMARY OF THE INVENTION

Accordingly, an object of the present invention is to perform printing with drive signals having appropriate waveforms for producing dots of the desired size.

Another object of the present invention is to perform printing in the top edge and bottom edge portions of a print medium by means of a printing scheme that is conformable to the printing scheme employed for the medial area of the print medium.

In a printing apparatus according to the present invention, a maskable drive signal generator selectively generates for each main scan pass any of n types of maskable drive signals where n is an integer equal to 2 or greater. A drive signal masking section generates the drive signal to be supplied to ink-expulsion drive elements of a print head, by means of masking the maskable drive signal according to the print signal on a per-pixel basis. A controller of the printing apparatus executes printing, on at least a part of the print medium, according to a specific printing scheme wherein printing ink dots on each raster line is completed in n×m main scan passes while employing each of the n types of maskable drive signals m times on each raster line where m is an integer equal to 1 or greater.

In many instances, different maskable drive signals produce different print characteristics. Specifically, certain maskable drive signals can produce dots suitable for higher resolutions, while certain other maskable drive signals can produce dots suitable for higher speeds. Accordingly, where printing is carried out by means of n types of maskable drive signals, printing is accomplished with characteristics representing a combination of the characteristics of each maskable drive signal.

In one embodiment, at least one of the n types of maskable drive signals can effect printing at a print resolution different from that produced by other maskable drive signals when used alone for printing; and when a printing operation is performed using the n types of maskable drive signals, the printing of ink dots and the sub-scan feed are carried at in units of pixel pitches conforming to a lowest print resolution of the print resolutions achievable by the respective n types of maskable drive signals.

In this way, it is possible to effect printing not only with dots of the lowest print resolution, but with dots of higher resolution (i.e., smaller dots) as well, thereby affording smoother tone reproduction.

In another aspect of the present invention, when conducting main scan passes using at least one specific maskable drive signal from among the n types of maskable drive signals, a main scan driver conducts the main scan at a speed different from that of main scan conducted using other maskable drive signals.

It is permissible for main scan passes employing different maskable drive signals to be conducted at different main scan speeds. By so doing, there is provided a greater degree of freedom during maskable drive signal generation, so that drive signals having appropriate waveforms for producing dots of the desired size may be generated easily.

In still another aspect of the present invention, the controller executes printing according to a first printing scheme in a medial section of a printable area of the print medium, while in at least one of a leading edge portion and trailing edge portion of the printable area, executes printing according to a second printing scheme whose amount of the sub-scan feed is smaller than in the first printing scheme. With respect to raster lines printed according to the first printing scheme alone, the controller completes printing in the n×m main scan passes employing each of the n types of maskable drive signals m times. With respect to raster lines printed according to both the first printing scheme and the second printing scheme, the controller selects the maskable drive signal for each main scan pass according to the second printing scheme such that at least n×m main scan passes are performed employing each of the n types of maskable drive signals at least m times on each of the raster lines.

It is frequently the case that different maskable drive signals have different print characteristics. Specifically, certain maskable drive signals produce dots at high resolution, while certain other maskable drive signals produce dots at high speed. Accordingly, where printing is carried out by means of n types of maskable drive signals, printing is accomplished with characteristics representing a combination of the characteristics of each maskable drive signal. According to this aspect of the present invention, main scanning of raster lines in the edge portions of the printing area is carried out n×m times, employing each of n types of maskable drive signals at least m times, whereby printing in the edge portions of the printing area may be accomplished with characteristics representing a combination of the characteristics of each maskable drive signal, just as in the medial area. That is, according to the present invention, it is possible to perform printing in the edge portions of a print medium by means of a printing scheme that is integrated with the specific printing scheme used in the medial section of the print medium.

In one embodiment, the print head is capable of producing a plurality of dot types of different size for at least one ink color on a print medium using the nozzles, and the print signal contains multiple bits per pixel so as to allow each pixel to be printed in multi tones. Each of the n types of maskable drive signals includes a plurality of pulses during each pixel interval, and the drive signal masking section masks the maskable drive signals responsive to the multiple-bit print signal.

The effect of the invention is particularly great in this cases because different maskable drive signals are particularly likely to be used with print heads that can produce dots of different sizes.

The printing apparatus may perform bidirectional printing where the printing of ink dots takes place in both forward and reverse passes. In this case, different maskable drive signals may be selected for the forward pass and the reverse pass of main scan. In addition or alternatively, one of the n types of maskable drive signals may be selected for each main scan pass; and the main scan driver may perform each main scan at a speed appropriate to the selected maskable drive signal.

In this way, generation of maskable drive signals and printing by means of the same are facilitated.

Included among the specific aspects of the invention are inter alia a printing apparatus and printing method, a computer program for performing the functions of this apparatus or method, a computer-readable medium for storing this computer program, and a data signal containing this computer program and embodied in a carrier wave.

These and other objects, features, aspects, and advantages of the present invention will become more apparent from the following detailed description of the preferred embodiments with the accompanying drawings.

BRIEF DESCRIPTION OF THE DRAWINGS

FIG. 12 illustrates printing using both the multi-shot dot series and variable dot series;

FIG. 17 shows scanning parameters for medial printing in the embodiment;

DESCRIPTION OF THE PREFERRED EMBODIMENTS

Figure 1:
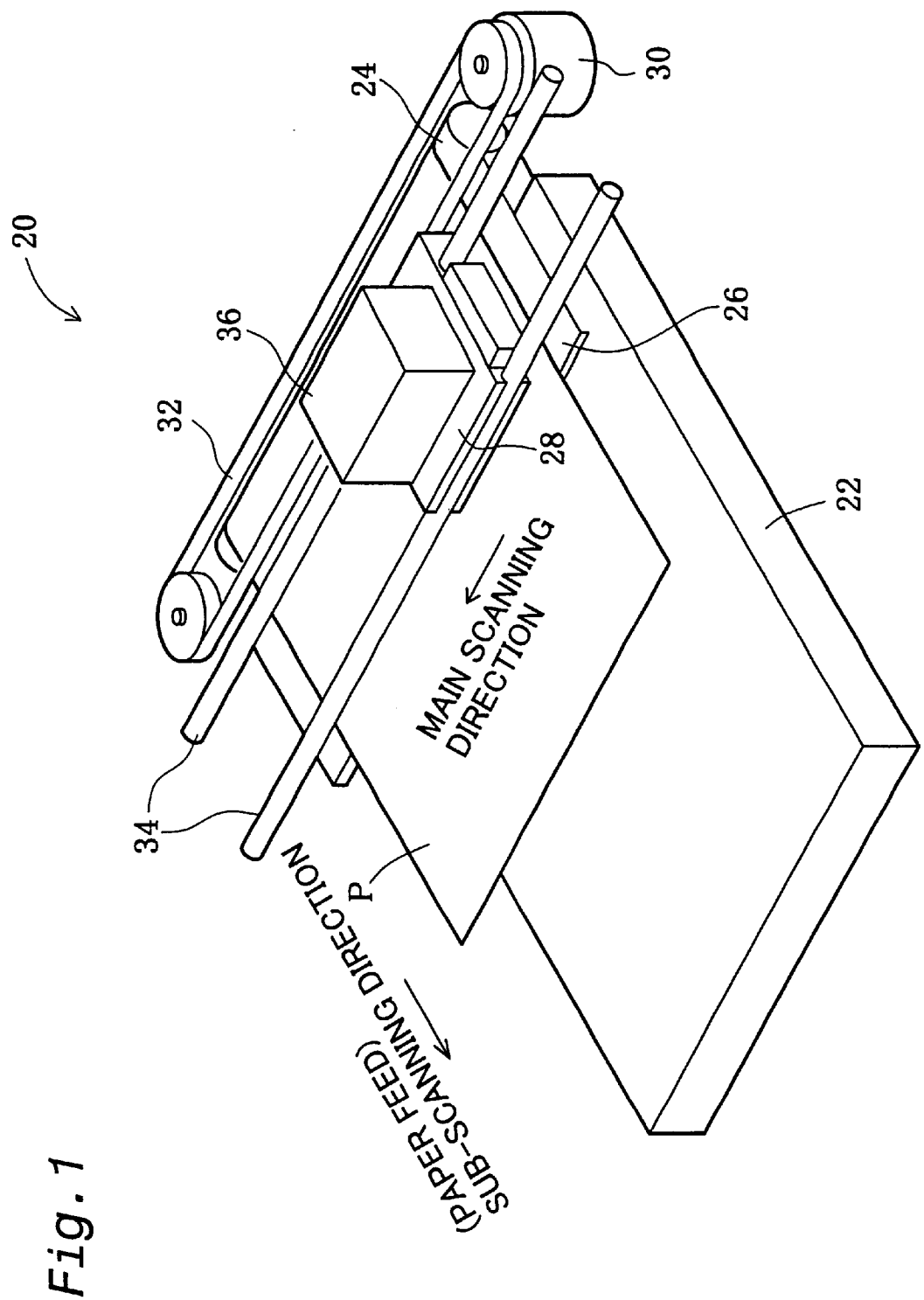
FIG. 1 is a simplified perspective view of an ink-jet printer 20 according to one embodiment of the invention.

Preferred embodiments of the invention will be described according to the following order:
  A: Overall Structure of the Apparatus
  B: Internal Structure of the Head Driver
  C. Basic Parameters for Normal Print Scheme
  D. Concept of Top Edge printing and Bottom Edge printing
  E. Specific Example of Printing scheme in the Embodiment
  F. Modification Examples A: Overall Structure of the Apparatus FIG. 1 is a simplified perspective view of an ink-jet printer 20 according to one embodiment of the invention. The printer 20 comprises a paper stacker 22, a paper feed roller 24 driven by a step motor (not shown), a platen 26, a carriage 28, a step motor 30, a loop belt 32 driven by step motor 30, and a guide rail 34 for carriage 28. The carriage 28 carries a print head 36 having a plurality of nozzles.

Printer paper P is taken up from the paper stacker 22 by the paper feed roller 24 and advanced over the surface of the platen 26 in the sub-scanning direction. The carriage 28 is towed by the loop belt 32 driven by the step motor 30, and moves in the main scanning direction along the guide rail 34. The main scanning direction is perpendicular to the sub-scanning direction.

Figure 2:
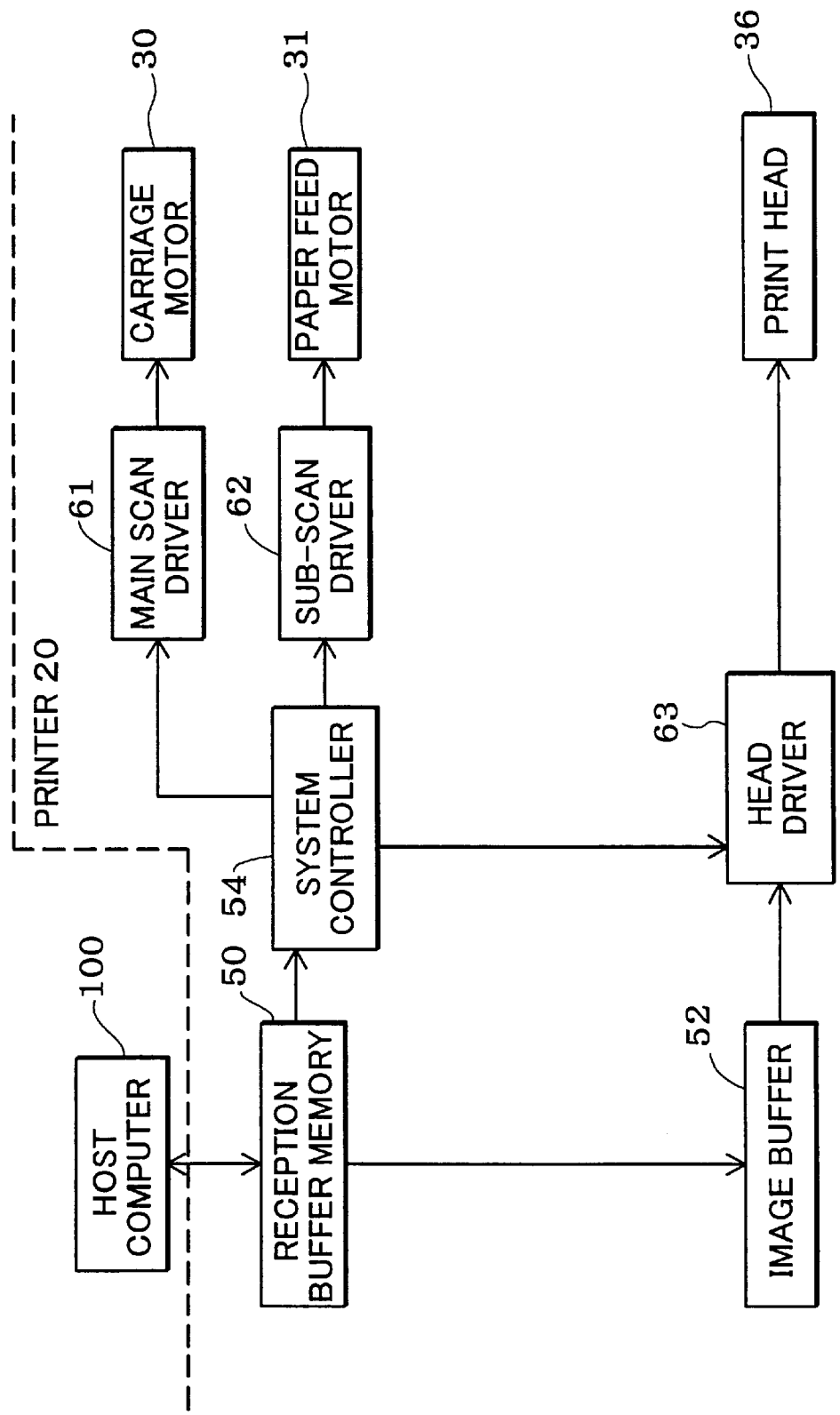
FIG. 2 is a block diagram of the electrical system of printer 20.

FIG. 2 is a block diagram of the electrical system of the printer 20. The printer 20 comprises a reception buffer memory 50 for receiving signals transmitted from a host computer 100, an image buffer 52 for storing print data, and a system controller 54 for controlling all operations of the printer 20. The system controller 54 is connected to a main scan driver 61 for driving the carriage motor 30, a sub-scan driver 61 for driving the paper feed motor 31, and a head driver 63 for driving the print head 36.

A printer driver (not shown) provided in the host computer 100 sets various parameters defining a print operation on the basis of a user-specified printing scheme (described later). The printer driver also generates, on the basis of these parameters, print data for printing in the specified printing scheme, and sends the print data to the printer 20. The print data is temporarily held in the reception buffer memory 50. In the printer 20, the system controller 54 reads the required information from the print data stored in the buffer memory 50, and on the basis thereof sends control signals to the drivers 61, 62, and 63.

The image buffer 52 stores image data for a plurality of ink colors, produced by separating for each color the print data received in the reception buffer memory 50. The head driver 63, responsive to a control signal from the system controller 54, reads the image data for each color from the image buffer 52 and in response thereto drives a nozzle array for each color provided to the print head 36. The head driver 63 can generate drive signals having a plurality of different waveforms. The internal structure and operation of the head driver 63 will be described in greater detail later.

Figure 3:
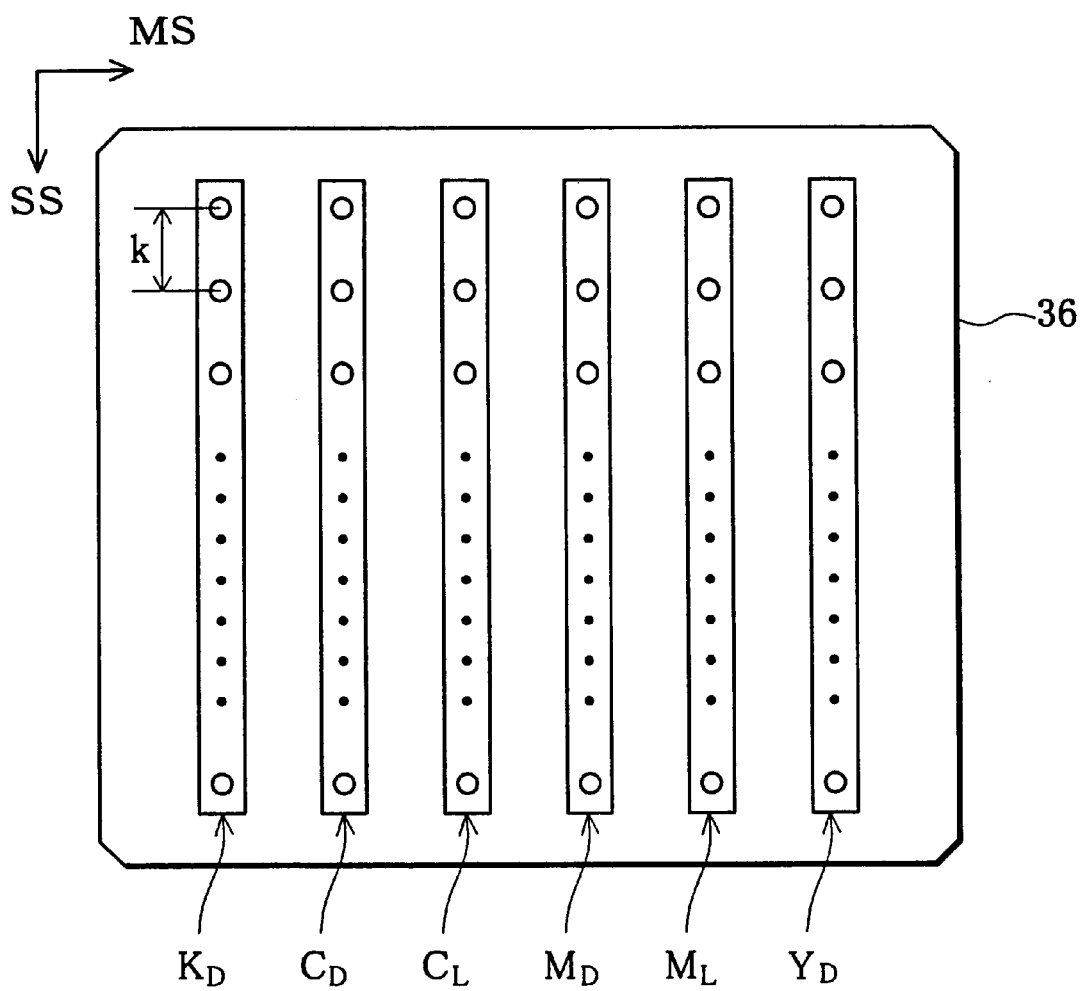
FIG. 3 illustrates the nozzle array provided on the bottom face of a print head 36.

FIG. 3 shows the nozzle array provided on the bottom face of the print head 36. The bottom face of the print head 36 has formed therein a black ink nozzle group $K_D$ for emitting black ink, a dark cyan ink nozzle group $C_D$ for emitting dark cyan ink, a light cyan ink nozzle group $C_L$ for emitting light cyan ink, a dark magenta ink nozzle group $M_D$ for emitting dark magenta ink, a light magenta ink nozzle group $M_L$ for emitting light magenta ink, and a yellow ink nozzle group $Y_D$ for emitting yellow ink.

The initial capital letter in the symbols for the nozzle groups indicates the ink color. A subscripted "$_D$" indicates ink of relatively high color density and a subscripted "$_L$" indicates ink of relatively low color density.

The plurality of nozzles of each nozzle group are arranged at a given nozzle pitch k in the sub-scanning direction SS. The nozzle pitch k is an integral multiple of a print resolution (also called a dot pitch) in the sub-scanning direction. Each nozzle is provided with a piezo-electric element (not shown), a drive element that drives the nozzle so as to emit droplets of ink. During printing, ink droplets are emitted from the nozzles as the print head 36 moves in the main scanning direction MS together with the carriage 28 (FIG. 1).

B: Internal Structure of the Head Driver

Figure 4:
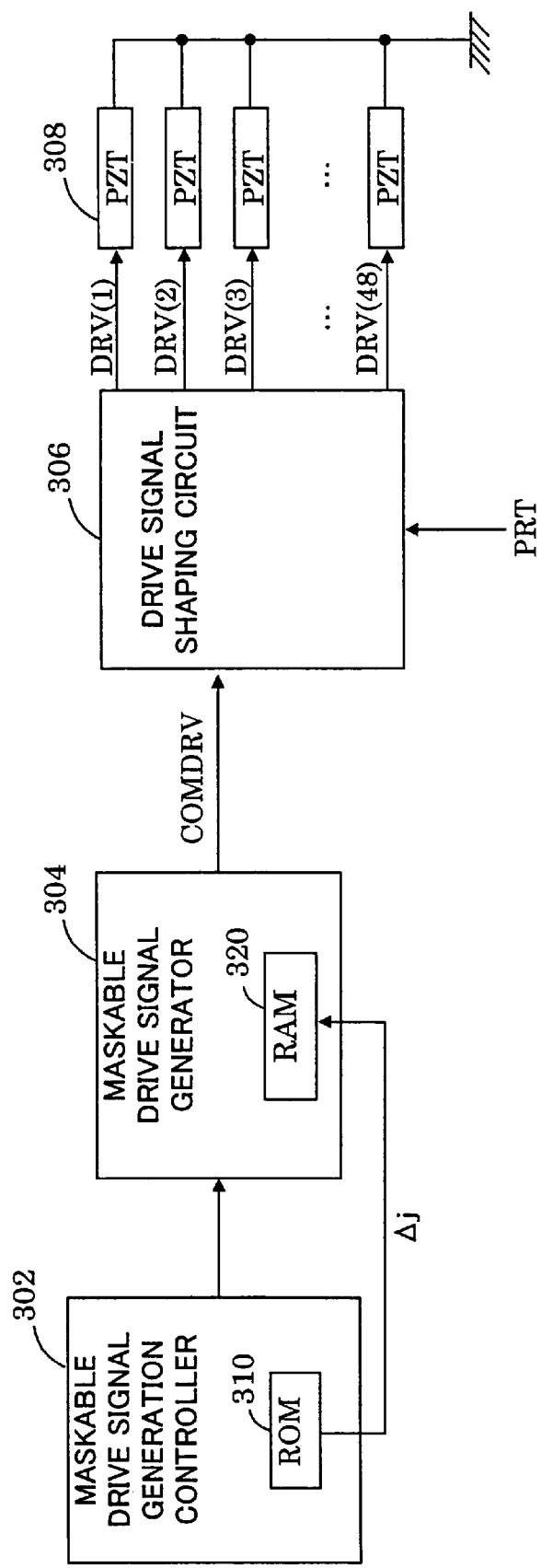
FIG. 4 is a block diagram showing the internal structure of the head driver 63 (FIG. 2)

FIG. 4 is a block diagram showing the internal structure of the head driver 63 (FIG. 2). The head driver 63 comprises a maskable drive signal generation controller 302, a maskable drive signal generator 304, and a drive signal shaping circuit 306.

The maskable drive signal generator 304 comprises RAM 320 for storing a slope value $\Delta j$ that indicates the slope of the waveform of the maskable drive signal COMDRV. Slope value $\Delta j$ is used to generate a maskable drive signal COMDRV of arbitrary slope. The maskable drive signal generation controller 302 comprises ROM 310 (or PROM) in which is stored a plurality of slope values $\Delta j$ for the forward and reverse passes of main scanning. Drive signal shaping circuit 306 generates a drive signal DRV by partially or completely masking the maskable drive signal COMDRV in response to the value of a serial print signal PRT supplied from the image buffer 52 (FIG. 2). This drive signal is presented to the piezo-electric elements 308, which are the drive elements of the nozzles.

Figure 5:
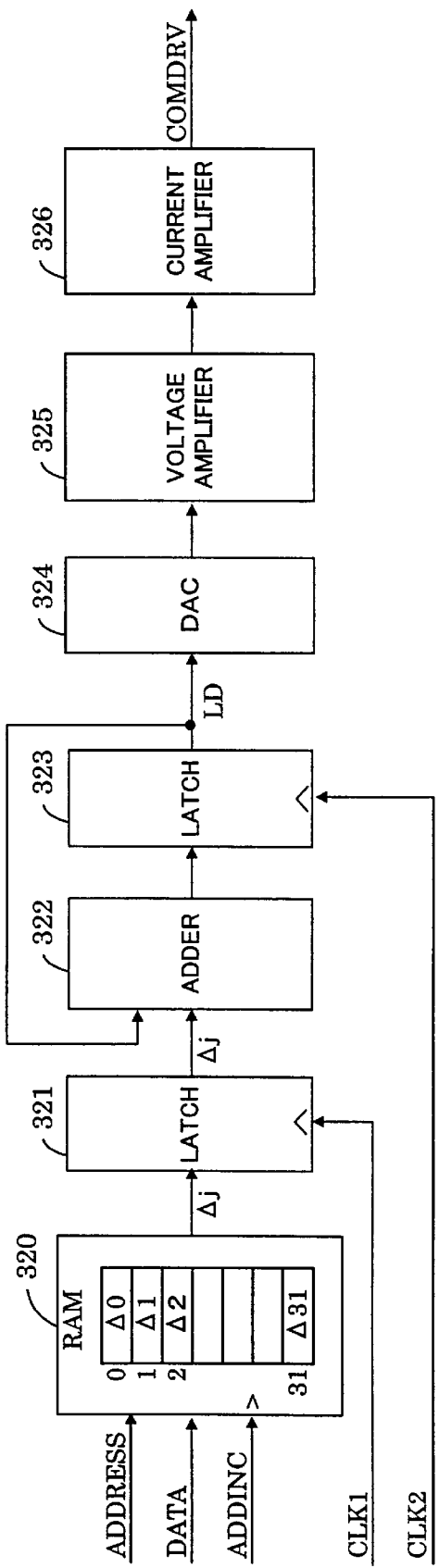
FIG. 5 is a block diagram showing the internal structure of maskable drive signal generator 304.

FIG. 5 is a block diagram showing the internal structure of the maskable drive signal generator 304. In addition to RAM 320, the maskable drive signal generator 304 comprises a first latch circuit 321, an adder 322, a second latch circuit 323, a D/A converter 324, a voltage amplifier 325, and a current amplifier 326. These circuit elements are connected in series in the order recited here.

RAM 320 can store up to 32 slope values $\Delta 0 \sim \Delta 31$. To write a slope value $\Delta j$ to RAM 320, data indicating slope value $\Delta j$ and an address are sent to RAM 320 by the maskable drive signal generation controller 302. To read a slope value $\Delta j$ from RAM 320, the address increment terminal of RAM 320 is presented with an address increment signal ADDINC by the maskable drive signal generation controller 302. A slope value $\Delta j$ output by RAM 320 is held in the first latching circuit 321 in response to a pulse of a clock signal CLK1. A pulse of the clock signal CLK1 is issued at given delay interval after the address increment signal ADDINC. Thus, each time the slope value $\Delta j$ output by RAM 320 is updated, the new slope value j is held by the first latching circuit 321.

The second latching circuit 323 holds the output of the adder 322 for the duration of a given cycle in response to the second clock signal CLK2 pulses issued at given cycles. The adder 322 adds the slope value $\Delta j$ held by the first latching circuit 321 with the result of the previous adding operation currently being held by the second latching circuit 323. This new add operation result is then held by the second latching circuit 323 in response to the subsequent pulse of the second clock signal CLK2. In other words, the adder 322 and the second latching circuit 323 function as an accumulator for sequentially accumulating slope values $\Delta j$ at given intervals. The output of the second latching circuit 323 shall hereinafter be referred to as "drive signal level data LD" or simply as "level data LD." Analog signals output from the D/A converter 324 are amplified by the voltage amplifier 325 and the current amplifier 326 to generate a maskable drive signal COMDRV.

Figure 6:
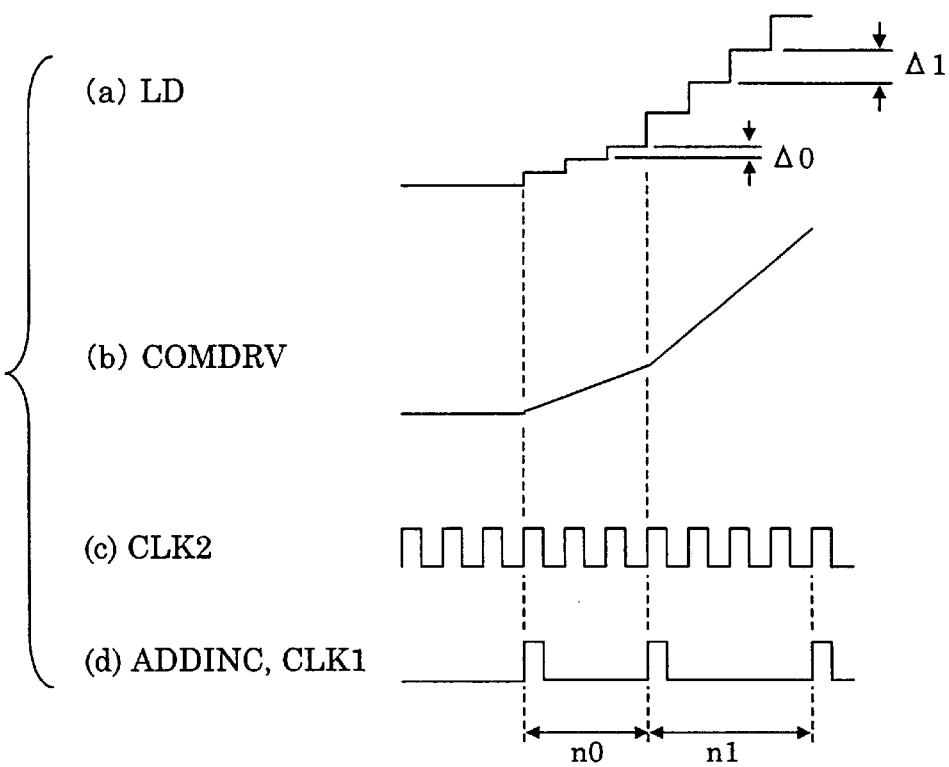
FIG. 6 is a timing chart for generating a maskable drive signal COMDRV by a maskable drive signal generator 304.

FIG. 6 is a timing chart for generating maskable drive signal COMDRV by the maskable drive signal generator 304. When RAM 320 is presented with an initial pulse of the address increment signal ADDINC (FIG. 6(d)), a first slope value $\Delta 0$ is read from RAM 320, held by the first latching circuit 321, and input to the adder 322. In FIG. 6, the address increment signal ADDINC and the first clock signal CLK1 are shown as being the same, but in actual practice a pulse of the first clock signal CLK1 will occur with a given delay after a pulse of the address increment signal ADDINC.

Until presented with the next pulse of the address increment signal ADDINC, the first slope value $\Delta 0$ is repeatedly incremented each time that the second clock signal CLK2 rises, thereby producing the level data LD. When RAM 320 is presented with the next pulse of the address increment signal ADDINC, a second slope value $\Delta 1$ is read from RAM 320, held by the first latching circuit 321, and input to the adder 322. In other words, the address increment signal ADDINC (and the first clock signal CLK1) are signals that generate a single pulse each time when a number of pulses of the second clock signal CLK2 becomes equal to a predetermined adding operation count nj (j=1~30) for the slope value $\Delta j$.

By using a slope value $\Delta j$ of zero, the level of the maskable drive signal COMDRV can be held to horizontal whereas, by using negative slope value $\Delta j$, the level of maskable drive signal COMDRV can be dropped. Accordingly, by setting the values of slope values $\Delta j$ and the adding operation count nj, it is possible to produce various maskable drive signals COMDRV of desired waveforms.

Figure 7:
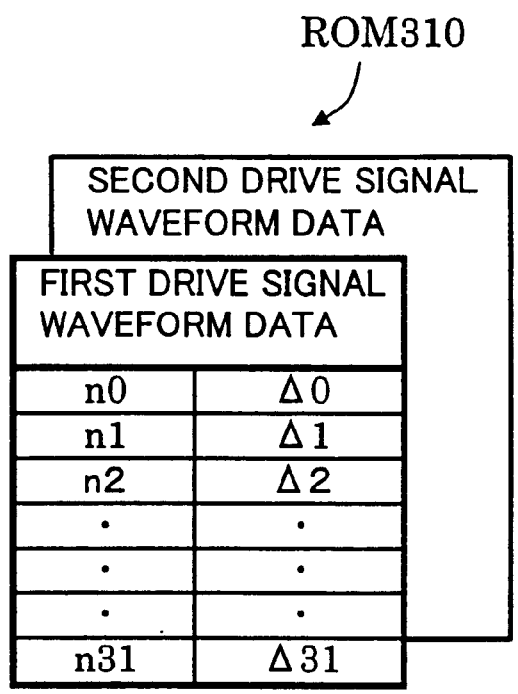
FIG. 7 illustrates waveform data stored in ROM 310 of maskable drive signal generation controller 302.

FIG. 7 shows waveform data stored in ROM 310 of the maskable drive signal generation controller 302. ROM 310 stores a plurality of slope values $\Delta j$ and their adding operation counts nj for each of a plurality of drive signal waveforms. During the intervals between forward and reverse passes of the main scanning (i.e., the periods for which the carriage 28 is positioned at the edge section of printer 20, outside the printable area), the maskable drive signal generation controller 302 performs an operation wherein a plurality of slope values $\Delta j$ to be used during the subsequent forward or reverse pass are written to RAM 320 of the maskable drive signal generator 304. The adding operation counts nj are used in generating the address increment signal ADDINC and the first clock signal CLK1 in the maskable drive signal generation controller 302. The use of the maskable drive signal generator 304 depicted in FIGS. 4 to 7 allows a plurality of maskable drive signals COMDRV having arbitrary waveforms to be generated selectively for each main scan.

Figure 8:
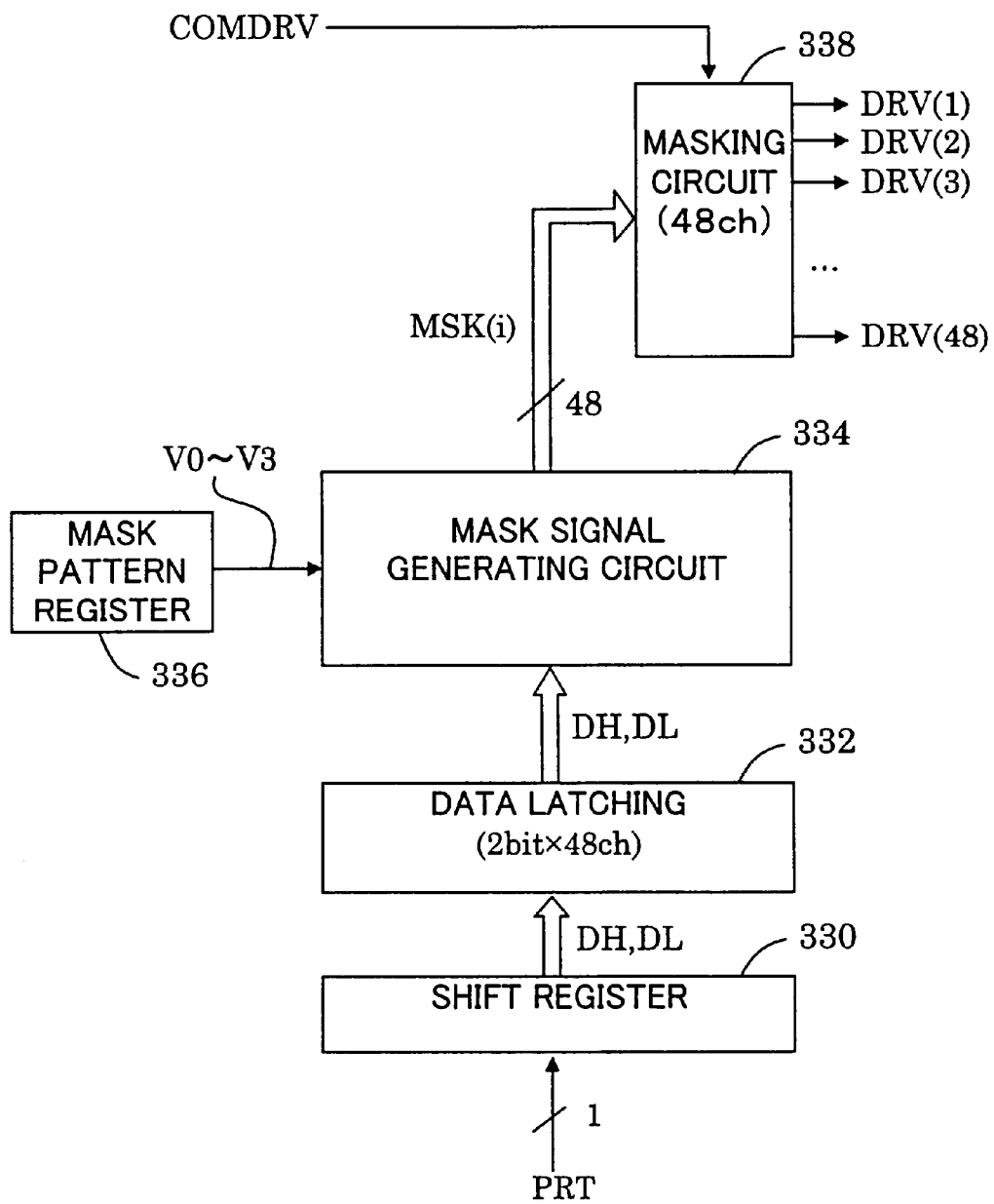
FIG. 8 is a block diagram of the internal structure of a drive signal shaping circuit 306.

FIG. 8 is a block diagram of the internal structure of the drive signal shaping circuit 306. The drive signal shaping circuit 306 comprises a shift register 330, a data latch 332, a mask signal generator 334, a mask pattern register 336, and a masking circuit 338. The shift register 330 converts the serial print signals PRT supplied from the image buffer 52 into 2-bit 48-channel parallel data. Here, each channel represents a signal for one nozzle. A print signal PRT for one pixel for one nozzle is composed of two bits, a most significant bit DH and a least significant bit DL. Mask signal generator 334 generates 1-bit mask signals MSK(i) (i=1~48) for each channel in response to mask pattern data VO~V3 provided by the mask pattern register 336 and 2-bit print signals PRT(DH, DL) for each channel,. The masking circuit 338 is an analog switching circuit that, in response to the mask signals MSK(i), partially or completely masks the waveform of the maskable drive signal COMDRV for a single pixel interval. As used herein, "masking the maskable drive signal" refers to turning on or off the connection of the signal line of the maskable drive signal COMDRV to the piezo-electric element.

Figure 9:
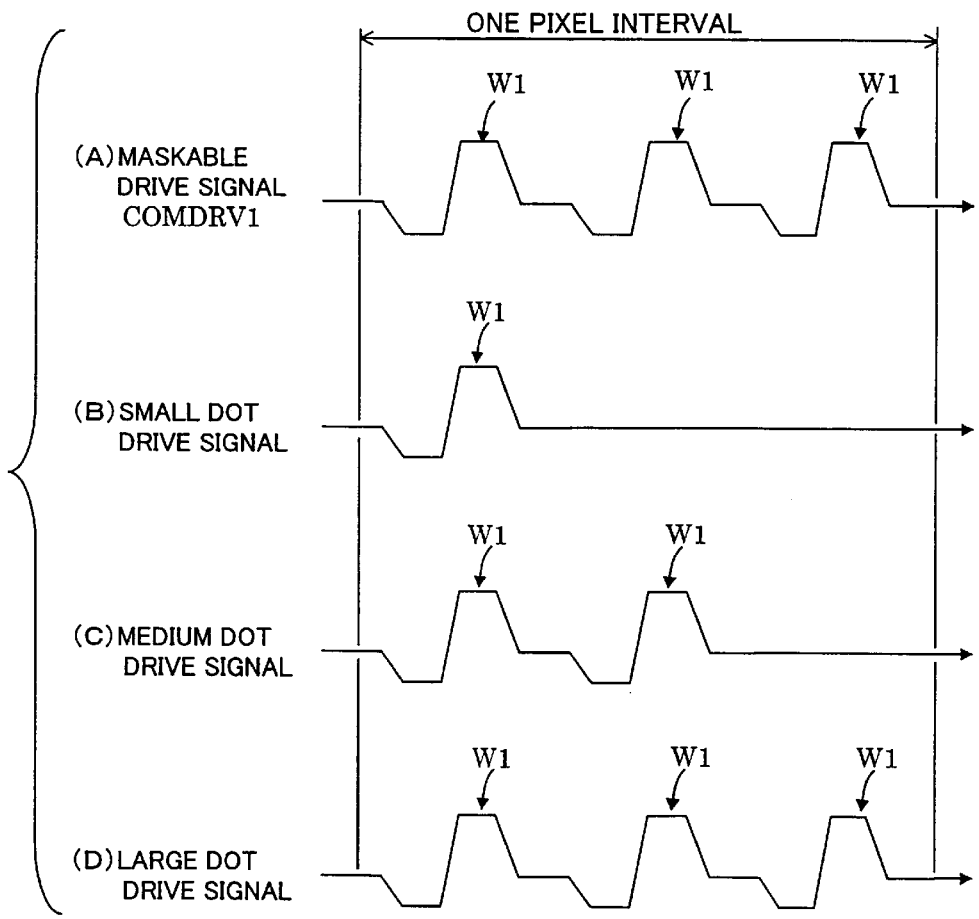
FIG. 9 is a timing chart showing a multi-shot dot drive signal waveform.

FIG. 9 is a timing chart showing a first drive signal waveform used in the present embodiment. As shown in FIG. 9(A), a first maskable drive signal COMDRV1 is a signal that produces three identical pulses W1 during a single pixel interval. As shown in FIGS. 9(B), (C), and (D), all pulses except the first pulse are masked to print a small dot, the third pulse is masked to print a medium dot, leaving the first and second pulses, and the entirety of the maskable drive signal COMDRV1 is used without any masking to print a large dot. By performing masking in this way for each pixel in response to serial print signals PRT, selective printing of a dot of any of three possible sizes at each pixel location is possible. The three types of dots produced by this first drive signal waveform shall hereinafter be referred to as "multi-shot dots."

Figure 10:
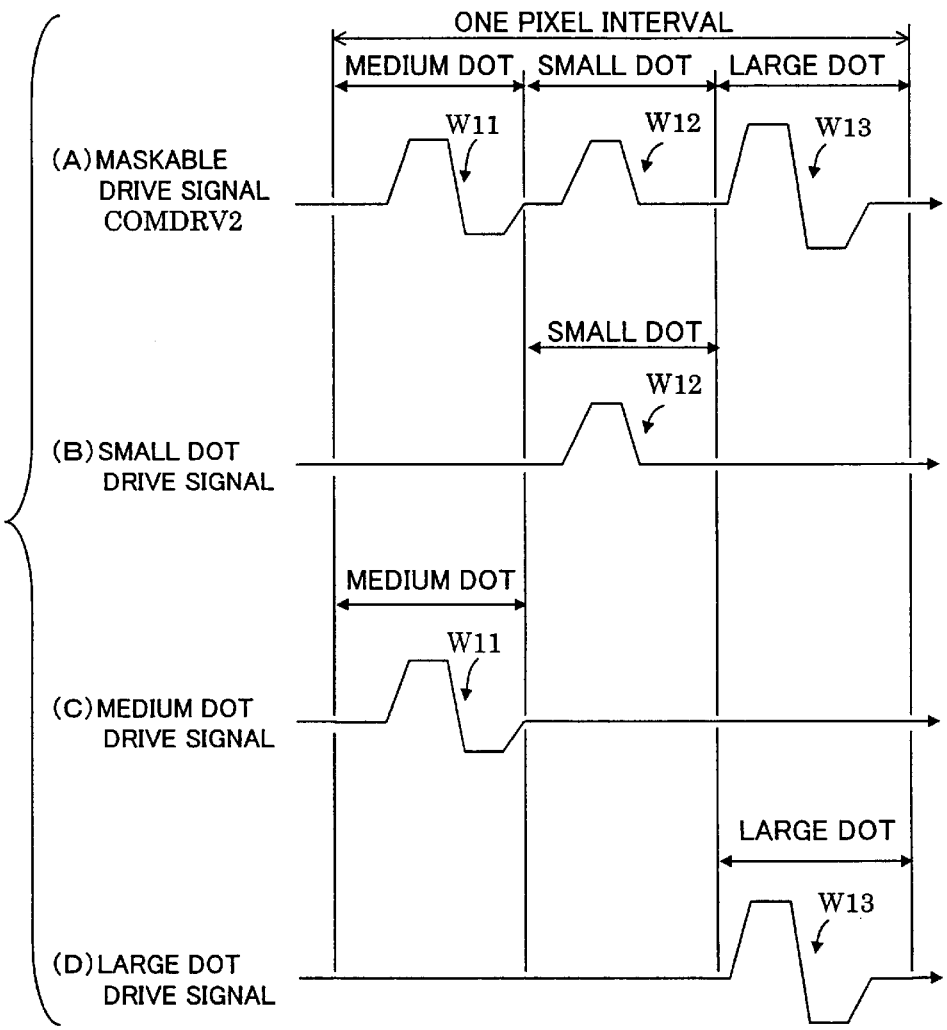
FIG. 10 is a timing chart showing a variable dot drive signal waveform.

FIG. 10 is a timing chart showing a second drive signal waveform used in the present embodiment. As shown in FIG. 10(A), in the second maskable drive signal COMDRV2, each single pixel interval is divided into three sub-intervals, with pulses W11, W12, and W13 having three different waveforms being generated in these sub-intervals, respectively. As shown in FIGS. 10(B), (C), and (D), all pulses except the second pulse W12 are masked to print a small dot, all pulses except the first pulse W11 are masked to print a medium dot, and all pulses except the third pulse W13 are masked to print a large dot. By performing masking in this way for each pixel in response to the serial print signals PRT, selective printing of a dot of any of three possible sizes at each pixel location is possible. The three types of dots produced by this second drive signal waveform shall hereinafter be referred to as "variable dots."

Figure 11A:
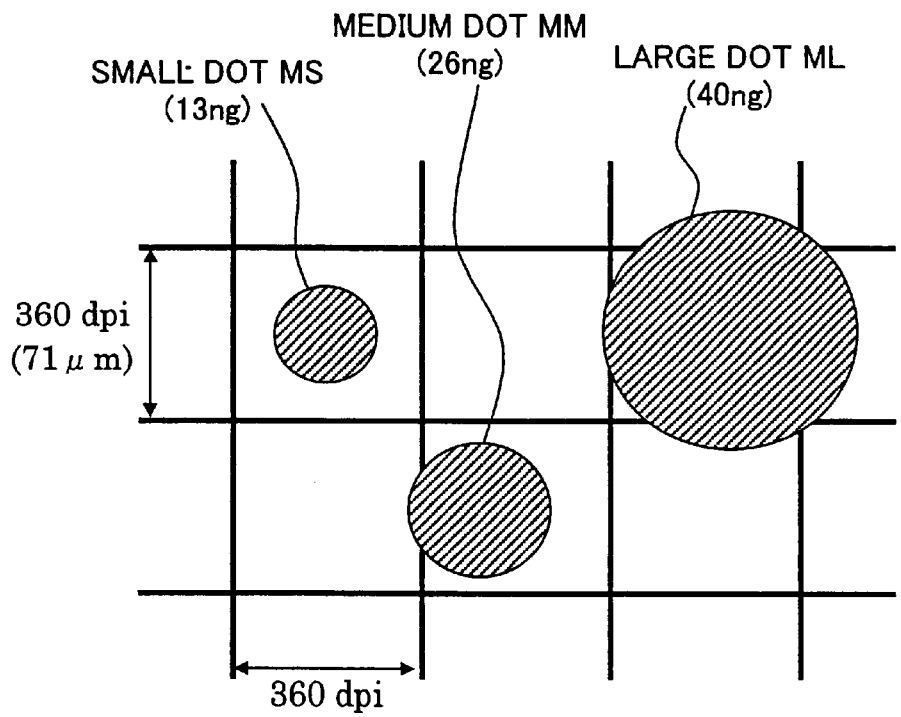
FIGS. 11(A) and 11(B) are illustrative diagrams comparing multi-shot dot and variable dot configuration.
Figure 11B:
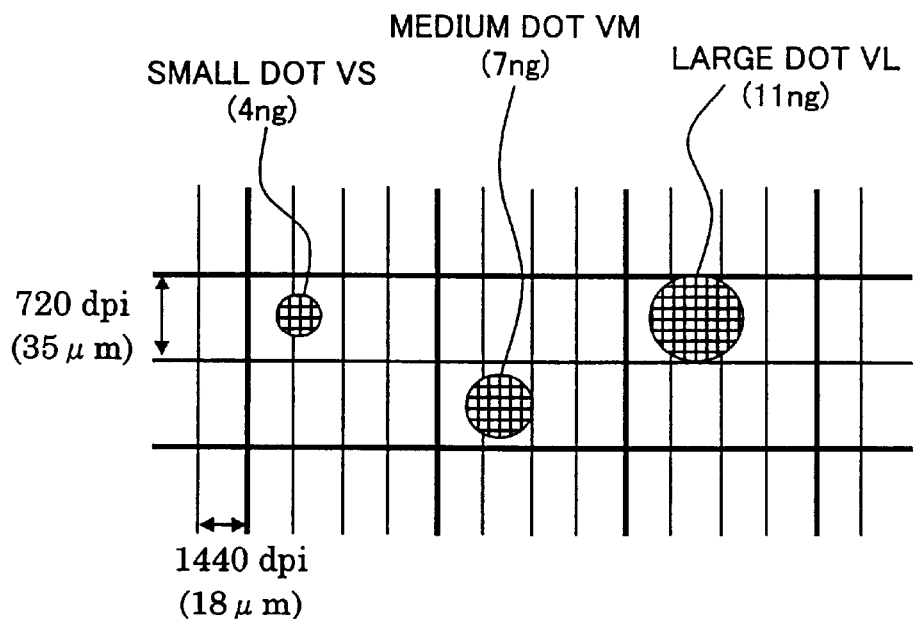

FIGS. 11(A) and 11(B) are illustrative diagram comparing multi-shot dot and variable dot configuration. As shown in FIG. 11(A), the smallest multi-shot dot MS is produced with an ink droplet of 13 ng (nano grams), the medium dot MM with 26 ng, and the large dot ML with 40 ng. Where only the three types of multi-shot dots MS, MM, and ML are used, print resolution in both the main scanning direction and the sub-scanning direction will be relatively low (360 dpi), but print speed will be relatively fast. The print resolution achievable using a single drive signal waveform in this way shall hereinafter be termed "print resolution in simplex mode."

As shown in FIG. 11(B), the smallest variable dot VS is produced with an ink droplet of 4 ng, the medium dot VM with 7 ng, and the large dot VL with 11 ng. Simplex mode print resolution using the variable dots is 1440 dpi in the main scanning direction and 720 dpi in the sub-scanning direction. The variable dots have the advantage of being able to print high quality images at higher resolution than with multi-shot dots. Even where printing is performed with the variable dots exclusively, it is difficult to print dots at 1440 dpi resolution in the main scanning direction during a single main scan pass. Accordingly, in actual practice, printing of all the dots on a single raster line is accomplished in four main scan passes. In other words, during each individual main scan, dots are printed on each raster line in a ratio of one of every four pixels, the dots printed during four main scan passes supplementing each other to effect complete printing on each raster line. The variable dots perform printing at lower speeds than the multi-shot dots, but afford higher resolution.

The term "multi-shot dot series" shall be used to refer collectively to the three kinds of multi-shot dots MS, MM, and ML, and the term "variable dot series" shall be used to refer collectively to the three kinds of variable dots VS, VM, and VL.

FIG. 12 is an illustrative diagram of printing conducted using both the multi-shot dot series and variable dot series. Where both dot series are used in printing, print resolution in the sub-scanning direction will be the lower of the two simplex mode print resolutions (namely, the multi-shot dot series print resolution).

Where the two dot series are used concomitantly, the multi-shot dot series and variable dot series may be overlaid on a same given raster line. The multi-shot dot series, when used for a given raster line, may target for printing all pixel locations on the raster line, and the variable dot series, used for the same raster line, may likewise target for printing all pixel locations on the raster line. However, in actual practice, superposition of two or more dots on a given pixel location results in unstable reproduction of image density. Accordingly, image processing by the printer driver in the computer 100 is preferably carried out in such a way that only one dot is printed at each single pixel location. As will be apparent from the preceding description, the term "overlay" is not limited to the narrow sense of actually printing two or more dots at the same exact pixel location, but includes the broader meaning of targeting the same pixel location for printing. The term "target a pixel location for printing" is used in the sense of "producing a state wherein a dot may be printed at a pixel location by means of driving the drive element."

By overlaying the multi-shot dot series and the variable dot series on each raster line, it becomes possible to print using dots of six different sizes. The multi-shot dot series is predominantly used in areas of high image density, while the variable dot series tends to be used in areas of low image density. Thus, in areas of low image density, it is possible to reduce dot granularity in substantially the same manner as when using the variable dot series exclusively. Where the two dot series are used concomitantly, an image can be reproduced using dots of six different sizes, affording better image quality than is the case where the multi-shot dot series is used alone.

The smallest dot MS of the multi-shot dot series is of 13 ng, while the largest dot VL of the variable dot series is of 11 ng, and thus the two dots are formed using about equal amounts of ink. Thus, when using two different dot series, by setting the size of the largest dot of the smaller dot series to about the same size as the smallest dot of larger dot series in this way, it is possible to achieve smoother halftone reproduction during printing using both dot series.

When the variable dot series is employed in printing, main scanning speed (carriage speed) is lower than main scanning speed when printing multi-shot dots alone. The reason is that the waveform of the variable dot maskable drive signal COMDRV2 (FIG. 10(A)) is more complex than the waveform of the multi-shot dot maskable drive signal COMDRV1 (FIG. 9(A)), and thus a single pixel interval of the drive waveform requires more time. By way of an example, in variable dot series printing, main scanning speed is about 200 cps (characters per second), whereas in multi-shot dot series printing, main scanning speed is about 250 cps. Where both dot series are used concomitantly, average main scanning speed is about 225 cps, which is lower than the speed for the multi-shot dot series simplex mode. Thus, printing speed is somewhat slower as well.

As noted, where the variable dot series is used alone, sub-scan resolution is 720 dpi, with printing of all the dots on each raster line being completed in four main scan passes. Thus, printing speed is fairly low. When both dots series are used concomitantly, on the other hand, sub-scan resolution is 360 dpi, with printing of all the dots on each raster line being completed in two main scan passes. Thus, printing speed is higher, close to that obtained using the multi-shot dot series alone. In low-resolution image areas, image quality is close to that achieved using the variable dot series alone. Thus, the concomitant use of both dot series affords both high printing speed close to that obtained using the multi-shot dot series alone, and high image quality close to that achieved using the variable dot series alone.

C. Basic Parameters for Ordinary Printing Scheme

Before proceeding to a detailed description of the printing scheme used in the embodiments of the invention, the basic parameters for the ordinary printing scheme will be described.

Figure 13:
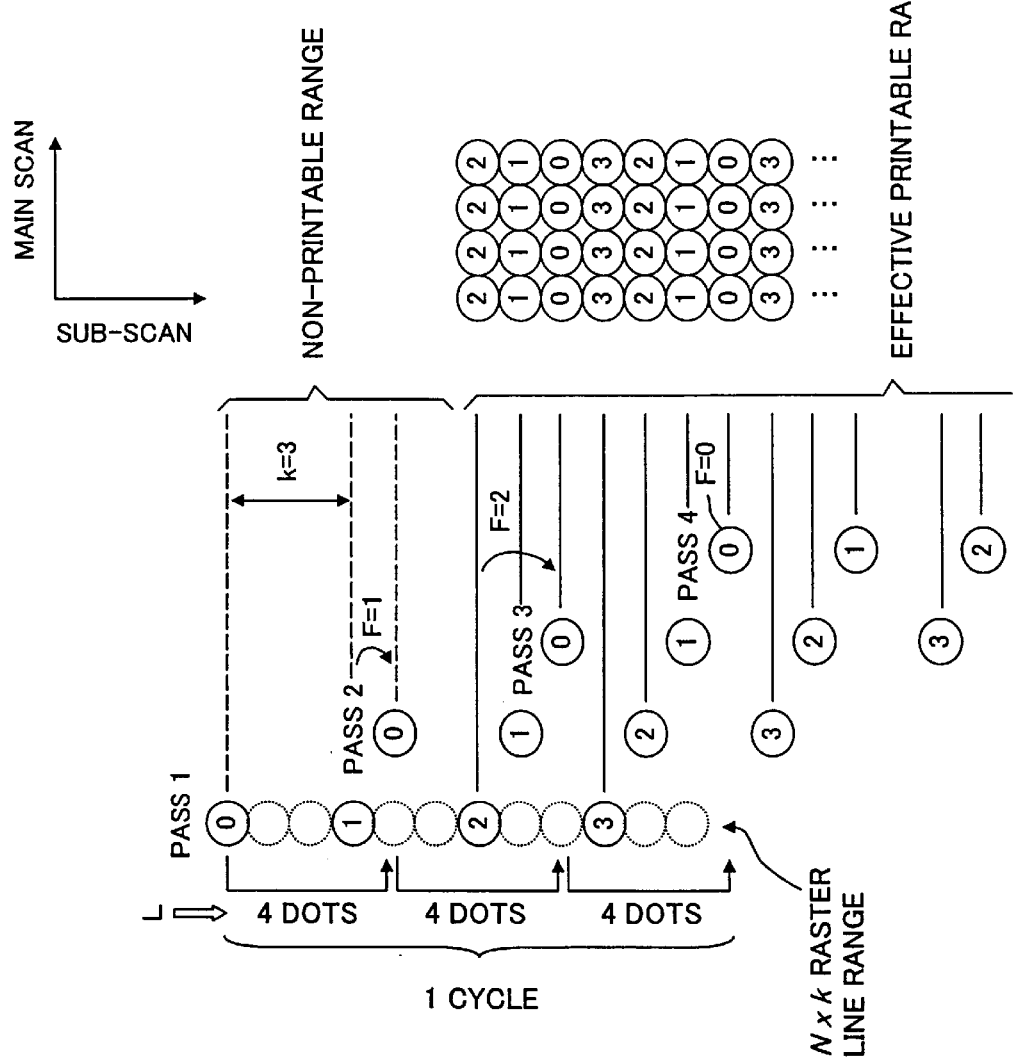
FIGS. 13(A) and 13(B) show basic parameters for the ordinary printing scheme.

FIGS. 13(A) and 13(B) show basic parameters for the ordinary printing scheme. FIG. 13(A) depicts an exemplary sub-scan using four nozzles, and FIG. 13(B) gives parameters for this printing scheme. In FIG. 13(A), the numbered solid circles indicate the positions of the four nozzles during each pass in the sub-scanning direction. Here, "pass" refers to one main scan. The numbers in the circles are the numbers assigned to the nozzles. The positions of the four nozzles move in the sub-scanning direction at the end of each main scan pass. In actual practice, feed in the sub-scanning direction is accomplished by moving the paper through the action of the paper feed motor 31 (FIG. 2).

As indicated at the left part of FIG. 13(A), sub-scan feed L in this example is a constant value equal to four dot pitches. Thus, during each subscan feed, the positions of the four nozzles move four dot-pitches in the sub-scanning direction. During each main scan the nozzles target for printing all of the dot locations (pixel locations) on each raster line. The number of main scan passes performed on each raster line (main scan line) is termed the "scan iteration count s."

The numbers assigned to the nozzles printing the dots on each raster line are indicated at the right part of FIG. 13(A). The raster lines indicated by broken lines extending rightward (the main scanning direction) from the circles that indicate nozzle positions in the sub-scanning direction are those for which the raster line located above and/or below is not printable, so in actual practice printing is prohibited there. On the other hand, the raster lines indicated by solid lines extending in the main scanning direction lie within a range such that both the preceding and following raster lines can be printed with dots. This actual printable range is termed the "effective printable range" or "printable area".

Various parameters relating to this printing scheme are given in FIG. 13(B). Printing scheme parameters include nozzle pitch k (in unit of: dots), number of working nozzles N, scan iteration count s, effective number of nozzles Neff, and sub-scan feed L (in unit of dots).

In the example depicted in FIGS. 13(A) and 13(B), nozzle pitch k is 3 dots. The number of working nozzles N is 4. The number of working nozzles N refers to the number of nozzles that are actually used, out of the plurality of nozzles provided in the head. The scan iteration count s indicates the number of main scan passes performed on each raster line to complete dot printing. For example, where the scan iteration count s is 2, each raster line would be scanned twice in the main scan direction to complete dot printing. Typically, in such a case, dots are produced at one-dot intervals during each of the two single main scan passes. In the example shown in FIGS. 13(A) and 13(B), the scan iteration count s is 1. The effective number of nozzles Neff is equal to the number of working nozzles N divided by the scan iteration count s. The effective number of nozzles Neff may be thought of as the net number of raster lines for which printing is completed in a single main scan.

The table given in FIG. 13(B) gives the sub-scan feed L during each pass, the cumulative value thereof $\Sigma L$, and the nozzle offset F. Nozzle offset F is a value indicating the distance (expressed in number of dots) of nozzle position from a reference position in the sub-scanning direction during each subsequent pass, this reference position being defined as the cyclically recurring position (in FIG. 13(A), positions four dots away) of a nozzle at which the offset during the initial pass is deemed to be zero. For example, as shown in FIG. 13(A), after pass 1, nozzle position moves in the sub-scanning direction by a distance equal to the sub-scan feed L (4 dots). Nozzle pitch k is 3 dots. Accordingly, during pass 2, the nozzle offset F is 1 (see FIG. 13(A)). Similarly, during pass 3, the nozzle position moves $\Sigma L=8$ dots from the initial position, so the offset F is 2. Nozzle position during pass 4 moves $\Sigma L=12$ dots from the initial position, so the offset F is 0. Since after three sub-scan feeds the nozzle offset F returns to 0 in pass 4, three sub-scans are designated as one cycle. By repeating this cycle, dots can be printed on all of the raster lines lying within the effective printable area.

As will be apparent from the example of FIGS. 13(A) and 13(B), when nozzle position is located away from the initial position by a distance equal to an integral multiple of the nozzle pitch k, the offset F is considered to be 0. The offset F is given by the remainder ($\Sigma L$) % k obtained by dividing the cumulative value $\Sigma L$ for sub-scan feed L by the nozzle pitch k. Here, % is an operator indicating that the division remainder is taken. If the initial position of the nozzle is thought of as a cyclically recurring position, the offset F can be viewed as the "phase shift" relative to initial nozzle position.

Where the scan iteration count s is 1, it is necessary for the following conditions to be met in order to avoid dropout or overlay of the raster lines in the effective printed area targeted for printing.

Condition c1: The number of sub-scan feeds in one cycle equals the nozzle pitch k.

Condition c2: During a single cycle, nozzle offset F after each sub-scan feed assumes a different value within the range 0~(k−1).

Condition c3: The average sub-scan feed ($\Sigma L/k$) equals the number of working nozzles N. In other words, the cumulative value ΣL for sub-scan feed L per cycle is equal to the product of the number of working nozzles N and nozzle pitch k, (N×k).

The above conditions may be understood by considering the following. Since (k−1) raster lines are present between adjacent nozzles, the number of sub-scan feeds per cycle must be equal to k in order to effect printing of these (k−1) raster lines during one cycle before the nozzles return to reference position (position at which offset is zero). If the number of sub-scan feeds per cycle is less than k, dropout of raster lines will occur, whereas if the number of sub-scan feeds per cycle exceeds k, some of raster lines will be printed more than once. Thus, the aforementioned first condition c1 holds.

Where the number of sub-scan feeds per cycle is equal to k, printed raster lines will be free from dropout and overlay only where nozzle offset F after each sub-scan feed assumes a different value within the range 0~(k−1). Thus, the aforementioned first condition c2 holds.

Where the aforementioned first and second conditions are met, during one cycle, each of the N nozzles prints k raster lines. Thus, N×k raster lines are printed during one cycle. If the third condition c3 is met, nozzle position after one cycle (i.e., after k sub-scan feeds) will be away from initial nozzle position by a distance equal to N×k raster lines, as shown in FIG. 13(A). Thus, where the first through third conditions c1~c3 are met, the printed raster lines will be free from dropout and overlay over the range of these N×k raster lines.

Figure 14:
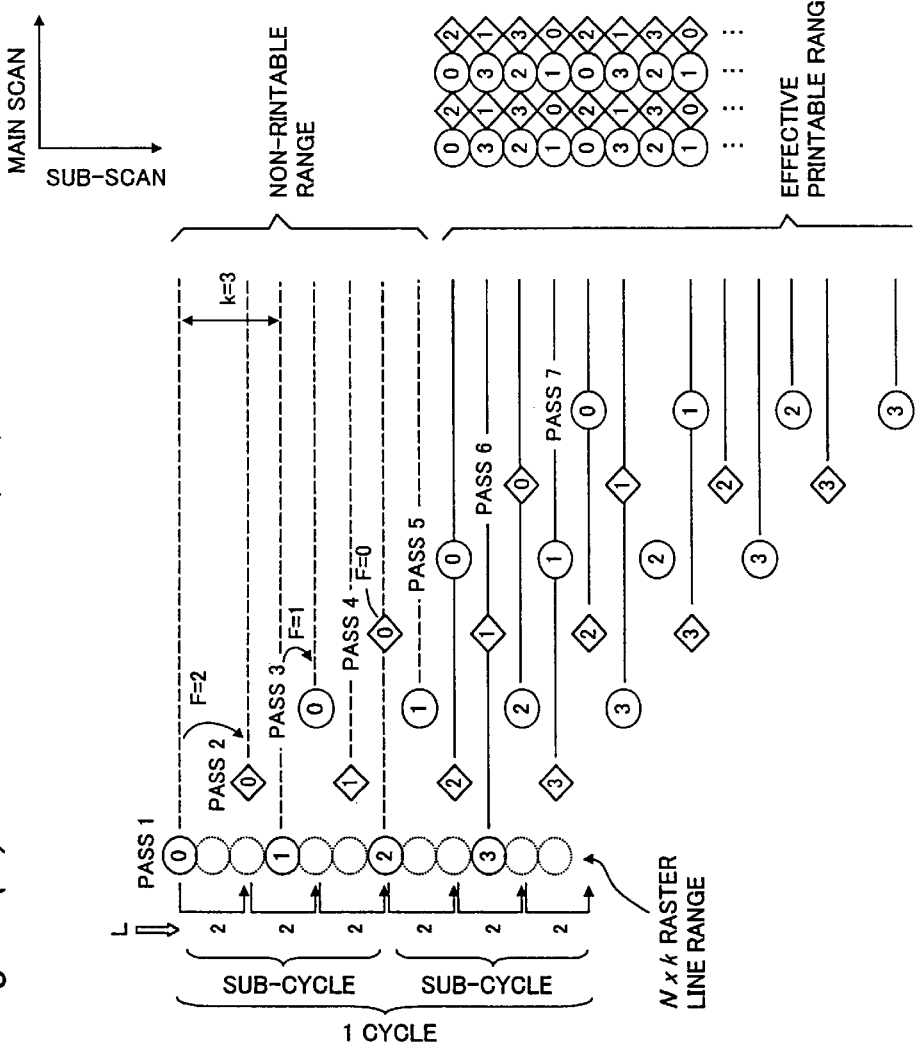
FIGS. 14(A) and 14(B) show basic parameters for the overlap printing scheme.

FIGS. 14(A) and 14(B) show basic parameters for a printing scheme wherein the scan iteration count s is 2 or greater. Where the scan iteration count s is 2 or greater, the same given raster line undergoes s main scan passes. The printing scheme wherein the scan iteration count s is 2 or greater shall hereinafter be referred to as "overlap scheme."

The printing scheme depicted in FIGS. 14(A) and 14(B) is different in the scan iteration count s and sub-scan feed L from the parameters for printing scheme depicted in FIG. 13(B). As will be apparent from FIG. 14(A), sub-scan feed L in the printing scheme depicted in FIGS. 14(A) and 14(B) is a constant value equal to two dots. In FIG. 14(A), nozzle positions during even-numbered passes are indicated by diamond shapes. Typically, the positions of dots printed during even-numbered passes are shifted by one dot-pitch in the main scanning direction relative to the positions of dots printed during odd-numbered passes, as shown at the right part of FIG. 14(A). Thus, the plurality of dots on a given raster line are printed in intermittent fashion by two different nozzles. For example, the uppermost raster line of the effective printable area is printed intermittently at one-dot intervals by nozzle 2 during pass 2, and then is printed intermittently at one-dot intervals by nozzle 0 during pass 5. In the overlap scheme, each nozzle is driven at intermittent timing so as to prohibit printing of (s−1) dots every time after printing one dot during one main scan.

The overlap scheme wherein intermittent pixel locations on a raster line are targeted for printing during each main scan is termed "intermittent overlap scheme." Alternatively, all pixel locations on a raster line may be targeted for printing during each main scan, rather than targeting intermittent pixel locations for printing. That is, overlaid printing of dots at a same given pixel location in the course of s main scan passes of a single raster line is permitted. This overlap scheme is termed "overlaid overlap scheme" or "complete overlap scheme."

In the intermittent overlap scheme, the positions of the plurality of nozzles printing a given raster line are shifted in the main scanning direction, so there are various possibilities as regards the actual amount of shift in the main scanning direction during main scan passes, apart from the configuration depicted in FIG. 14(A). For example, it would be possible during the pass 2 to not perform shifting in the main scanning direction so as to print dots at locations indicated by the circles, and during pass 5 to perform shifting in the main scanning direction so as to print dots at locations indicated by the diamonds.

The bottom row of the table in FIG. 14(B) gives the values of the offset F for each pass during one cycle. Each cycle is composed of six passes, with the offset F for each pass from pass 2 to pass 7 cycling twice through the range 0~2. The change in offset F during the three passes from pass 2 to pass 4 is the same as the change in offset F during the three passes from pass 5 to pass 7. As shown at the left part in FIG. 14(A), the six passes of one cycle can be divided into two sub-cycles each composed of three passes. Each cycle is complete when sub-cycles have been repeated s times.

Where the scan iteration count s is an integer equal to 2 or greater, the first to third conditions c1~c3 described earlier may be rewritten as conditions c1'~c3'.

Condition c1': The number of sub-scan feeds in one cycle equals the product of nozzle pitch k and scan iteration count s, i.e., (k×s).

Condition c2': During a single cycle, nozzle offset F after each sub-scan feed assumes a different value within the range 0~(k−1), with each value being repeated s times.

Condition c3': The average sub-scan feed (ΣL/(k×s)) equals the effective number of nozzles Neff (=N/s). In other words, the cumulative value ΣL for sub-scan feed L per cycle equals the product of the effective number of nozzles Neff and the sub-scan feed count (k×s), i.e., Neff×(k×s).

The above conditions c1'~c3' also hold where the scan iteration count s is 1. Thus, conditions c1'~c3' are generally true for the printing scheme regardless of the value of the scan iteration count s. That is, where conditions c1'~c3' are met, printed dots will be free from dropout and unwanted overlay within the effective printing area. Where the intermittent overlap scheme is employed, an additional requirement is that the positions of the nozzles printing a given raster line be mutually shifted in the main scanning direction. Where the overlaid overlap scheme is employed, it is sufficient simply to fulfill conditions c1'~c3', targeting all pixel locations for printing during each pass.

D. Concept of Top Edge Printing and Bottom Edge Printing

Figure 15:
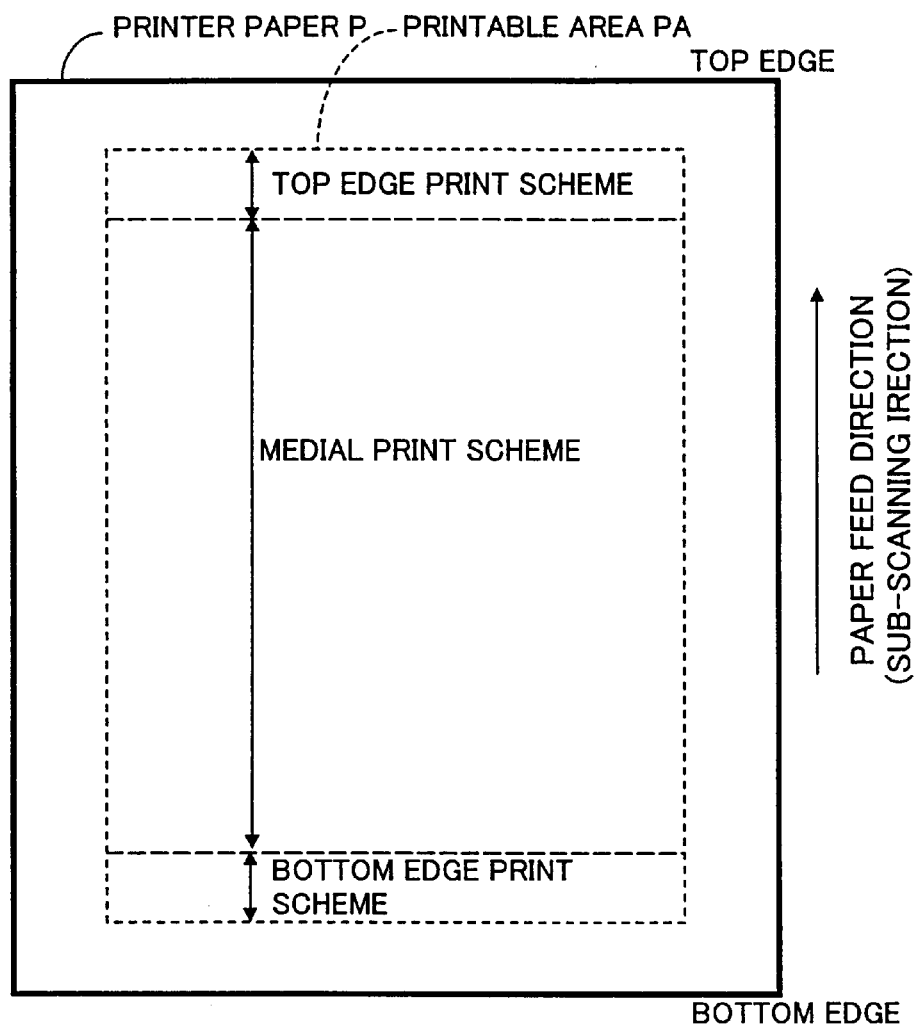
FIG. 15 illustrates the concept of applying the printing schemes of the embodiment.

FIG. 15 is an illustrative diagram illustrating the concept of implementing the printing schemes of the embodiment. A printable area PA in which printing is actually performed is established on printer paper P. For the middle area of printable area PA, a printing scheme for medial printing is employed. This medial printing scheme meets conditions c1'~c3 described earlier, and the printing scheme is designed to avoid dropout and unwanted superposition of the printed dots. At the top edge and bottom edge of printable area PA are respectively employed printing schemes for top edge printing and for bottom edge printing. The special printing process employed for the top edge of printer paper is termed "top edge printing" and the special printing process employed for the bottom edge of printer paper is termed "bottom edge printing."

Figure 16:
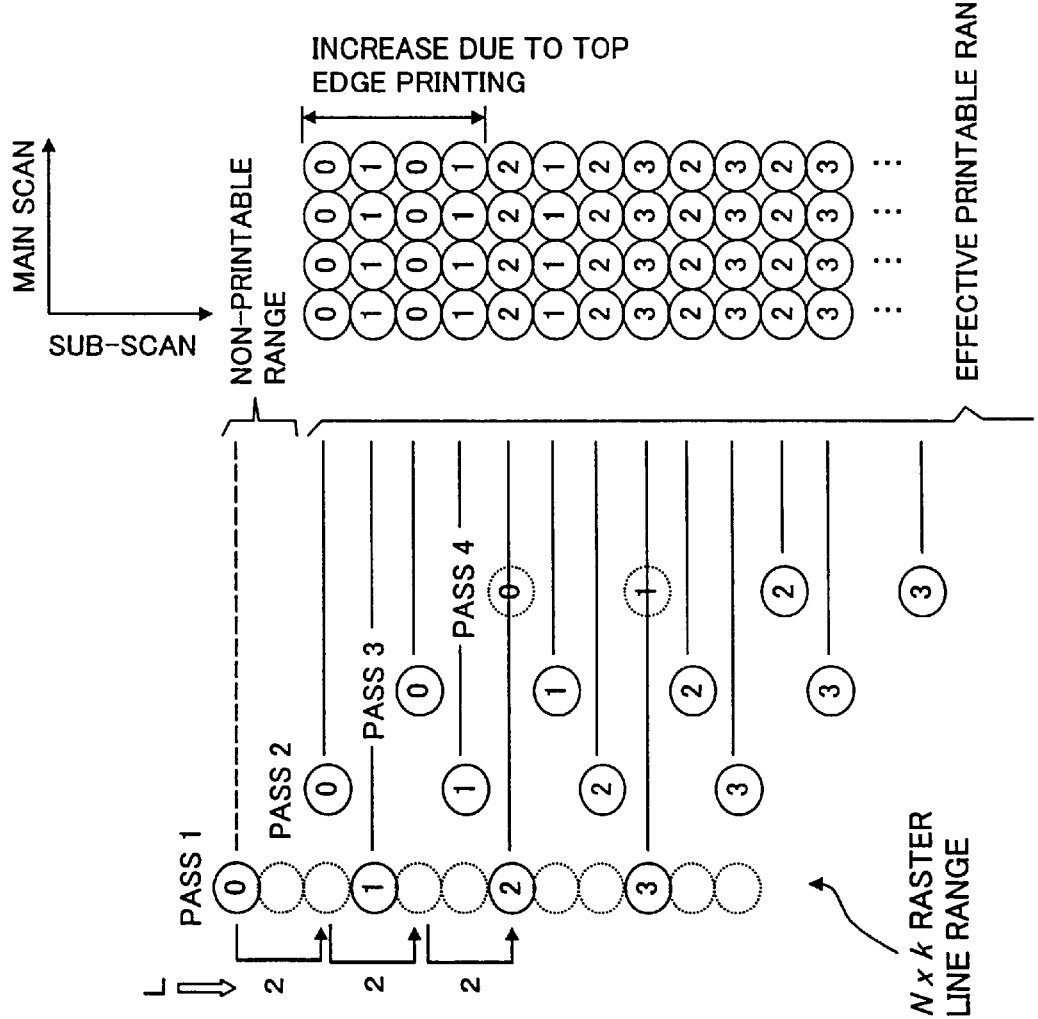
FIGS. 16(A) and 16(B) illustrate the concept of top edge printing of printer paper.

FIGS. 16(A) and 16(B) illustrate the concept of the printing process employed for the top edge of printer paper. For convenience, the examples mostly assume that the scan iteration count s is 1.

As shown in FIGS. 13(A) and 13(B) described earlier, an area in which effective printing is not possible (non-printable area) is present at the top edge of the paper. For top edge printing, the sub-scan feed is set to a value smaller than the feed used during medial printing, in order to reduce the non-printable area and expand the effective printing area. Specifically, in the top edge printing depicted in FIGS. 16(A) and 16(B), the sub-scan feed L is set to two dot-pitches, a value smaller than the sub-scan feed L of four dot-pitches used in the ordinary printing scheme depicted in FIGS. 13(A) and 13(B). It will be apparent that, as a result, the effective printing area is expanded by four raster lines relative to that in FIG. 13(A).

In pass 4 in FIG. 16(A), nozzle 0 and nozzle 1 do not perform printing. The reason is that the raster lines targeted for printing by nozzle 0 and nozzle 1 in pass 4 have already been targeted for printing by nozzle 2 and nozzle 3 in pass 1.

FIG. 16(B) gives scanning parameters for top edge printing. These scanning parameters do not meet conditions c1'~c3 in the ordinary printing scheme described earlier. The reason is that in top edge printing, overlaying of raster lines targeted for printing by working nozzles is permissible, as shown in FIG. 16(A).

Typically, in the printing scheme employed for top edge printing, the sub-scan feed value is smaller than in the printing scheme employed for the middle area of the paper (the area of the paper excluding the top edge and the bottom edge), thereby expanding the effective printable area. Bottom edge printing similarly employs a smaller sub-scan feed value than in the printing scheme employed for the middle area of the paper, thereby expanding the effective printable area. Since the concept of bottom edge printing is substantially identical to that of top edge printing and will be well understood by one of ordinary skill in the art, further discussion is not made here.

In some instances, variable feed (i.e., sub-scan feed with a number of different feed amounts) is employed in the middle area. Variable feed may be employed in top edge printing and bottom edge printing as well. In such cases, the average sub-scan feed for top edge printing will be smaller than the average sub-scan feed for medial printing. The same is true of bottom edge printing. The expression "smaller sub-scan feed" in used in a broad sense to include cases such as these.

E. Specific Example of Printing Scheme in the Embodiment

FIG. 17 shows scanning parameters for medial printing in the embodiment. This printing scheme is a overlaid overlap scheme wherein nozzle pitch k is 3, scan iteration count s is 2, and the number of working nozzles N is 46.

The table at the bottom of FIG. 17 gives parameters relating to pass 1 through pass 7. The drive signal waveforms for multi-shot dots and variable dots are used alternately at each pass; multi-shot dot waveform is used in the forward pass and variable dot waveform is used in the reverse pass. The sub-scan feed L is a constant value of 23 dot-pitches. This medial printing scheme is an overlaid overlap scheme wherein the scan iteration count s is 2. Variable feed may used for the sub-scan feed in place of the constant feed.

Figure 18:
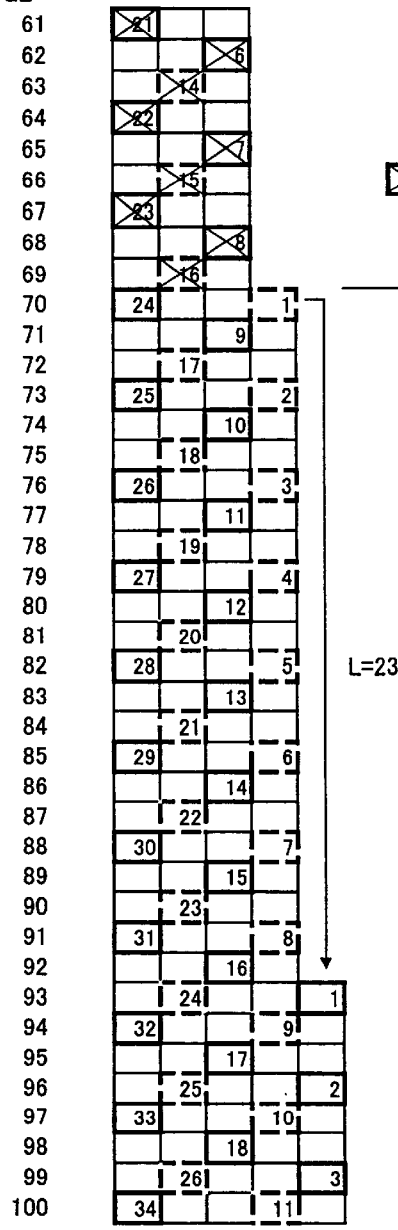
FIG. 18 shows numbers assigned to nozzles used in printing each raster line during each pass in medial printing.

FIG. 18 indicates the ordinal numbers of the nozzles responsible for printing on each raster line during each pass in medial printing. The "raster numbers" in FIG. 18 are numbered beginning at the top edge of accessible range for all nozzles of the print head 36, which includes a non-printable range (FIGS. 13(A), 14(A)). The raster number assignment assumes that top edge printing is not used. For convenience, the top 60 raster lines have been omitted from the drawing. An "X" drawn through a numbered cell indicates that the corresponding nozzle is not used. [In the area] extending from the top edge through raster line 69, [each raster] can be main scanned only once, so this represents a nonprintable area. Each raster line in the effective printing area is main scanned once with the multi-shot dot series and once with the variable dot series. Pass 6 and subsequent passes are not depicted.

Figure 19:
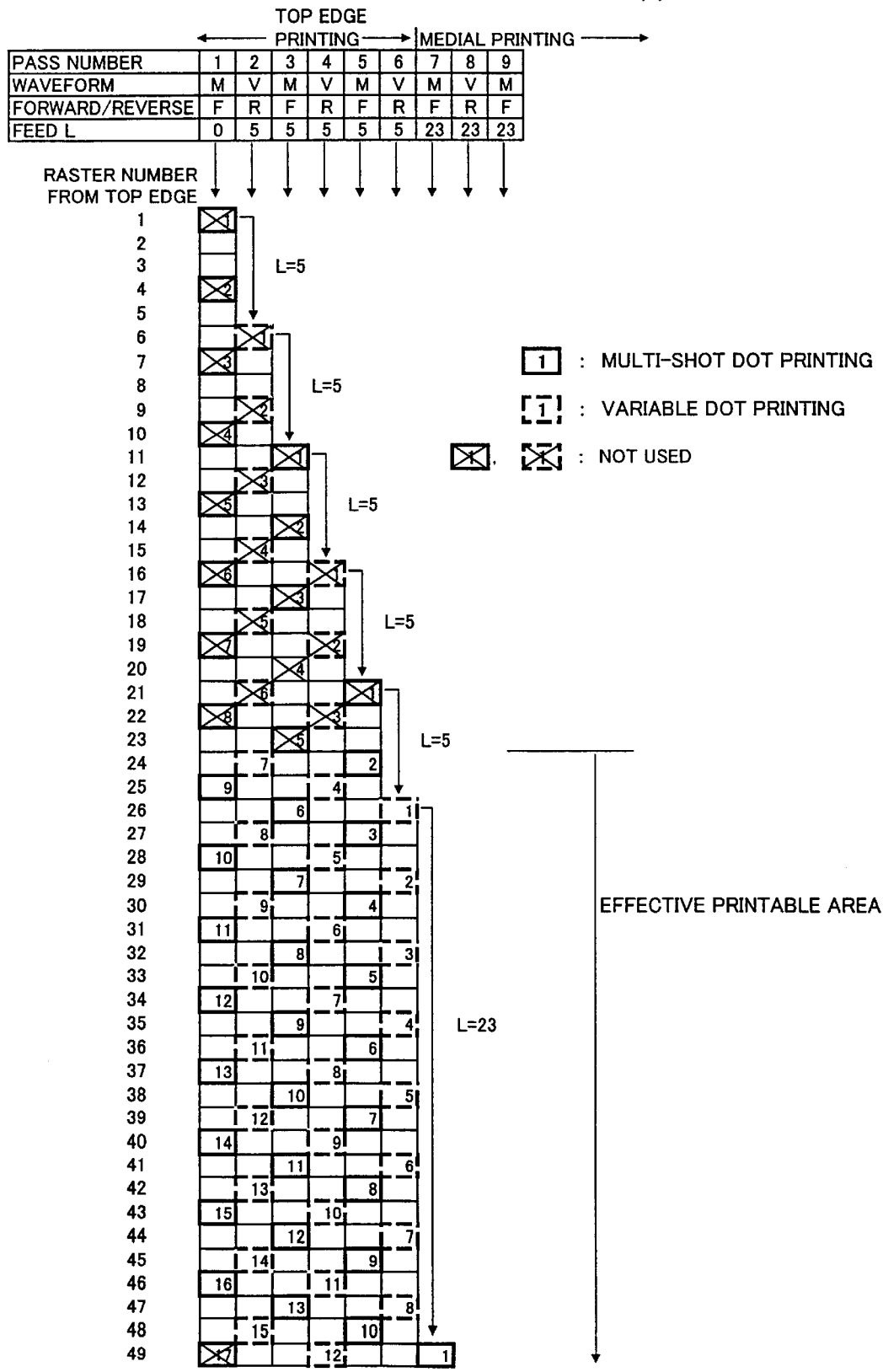
FIGS. 19 and 20 show scanning parameters for top edge printing in the embodiment and the nozzles employed for printing each raster line during each pass.
Figure 20:
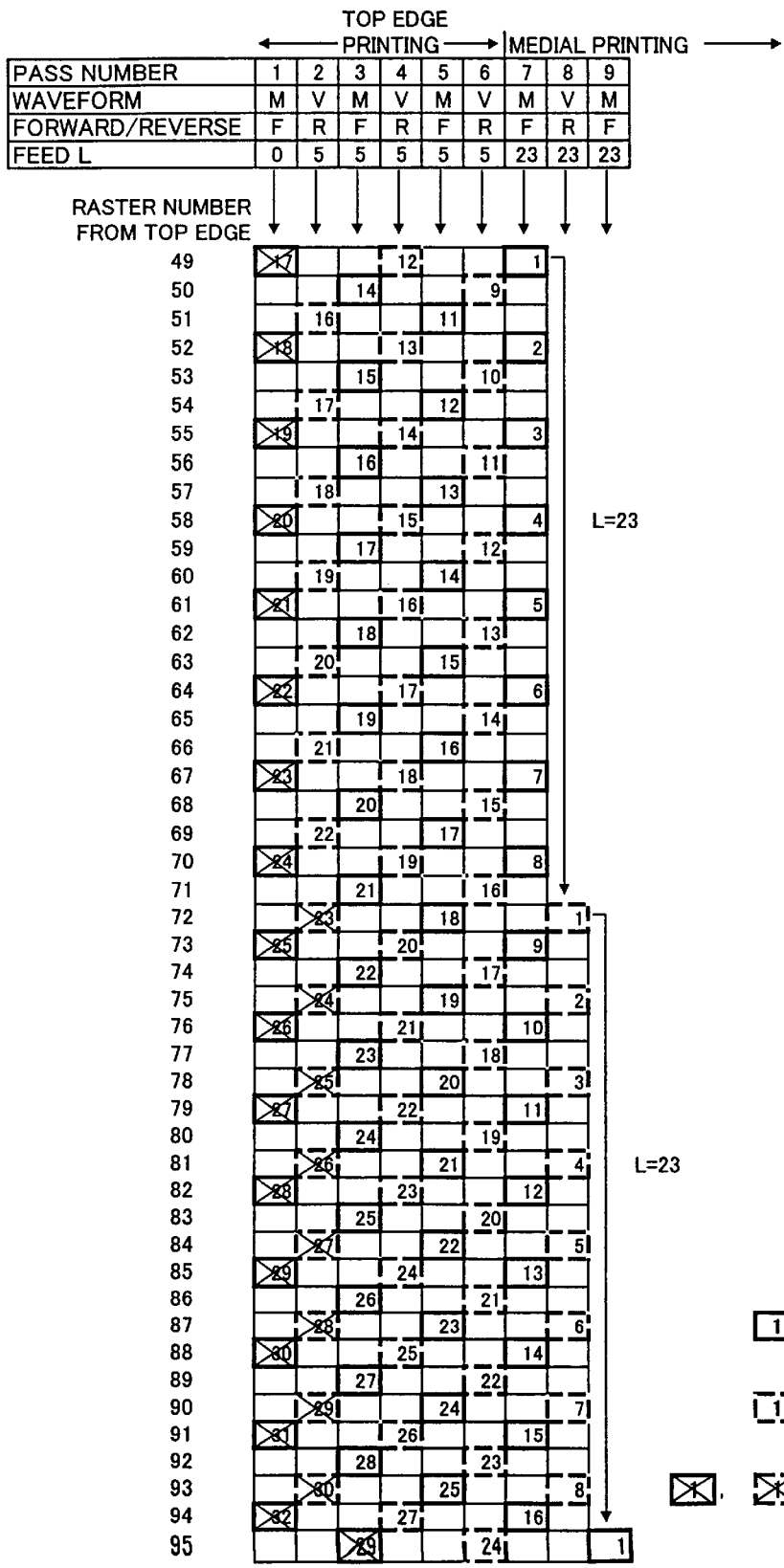

FIGS. 19 and 20 show scanning parameters for top edge printing in the embodiment and the nozzles employed for printing each raster line during each pass. As indicated in the table in FIG. 19, pass 1 through pass 6 represent top edge printing, and pass 7 and subsequent passes represent medial printing. A constant value of five dot-pitches is employed as the sub-scan feed L for top edge printing.

FIG. 19 shows raster lines 1 to 49 and FIG. 20 shows raster lines 49 to 95. In pass 1 through pass 6 (the main scan passes for top edge printing) only some of the 46 nozzles employed in medial printing are used.

As shown in FIG. 19, through the use of top edge printing, raster line 24 and subsequent lines now lie within the effective printable area. From comparison with FIG. 18 it will be apparent that the effective printable area has been expanded by 46 raster lines through top edge printing.

As shown in FIG. 20, each raster line is serviced once with the multi-shot dot series and once with the variable dot series, regardless of whether printing thereof has taken place during top edge printing or during medial printing. In other words, the drive signal waveform used for printing of a given raster line during top edge printing is selected such that this drive signal waveform differs from the drive signal waveform used for printing of this same raster line during medial printing. That is, raster lines that are printed using the multi-shot dot drive signal waveform during medial printing are printed using the variable dot drive signal waveform during top edge printing. Conversely, raster lines that are printed using the variable dot drive signal waveform during medial printing are printed using the multi-shot dot drive signal waveform during top edge printing.

Certain raster lines may in some instances undergo two passes with the same drive signal waveform. For example, the multi-shot dot drive signal waveform is used for raster lines 49, 52, 55 in FIG. 20 during pass 1 and pass 7. In pass 1, however, the nozzles that scan these raster lines are not actuated. In other words, according to the embodiment, the drive signal waveform for each pass is selected in such a way that each raster line is serviced at least once with each of the two drive signal waveforms. The nozzles to be actuated during top edge printing are selected appropriately so that each raster line is serviced at least once with each of the two drive signal waveforms. By so doing, it is possible to effect printing on the raster lines, which are printed by top edge printing, using a combination of the multi-shot dot series and the variable dot series, in the same manner as the raster lines that are printed by medial printing alone.

Figure 21:
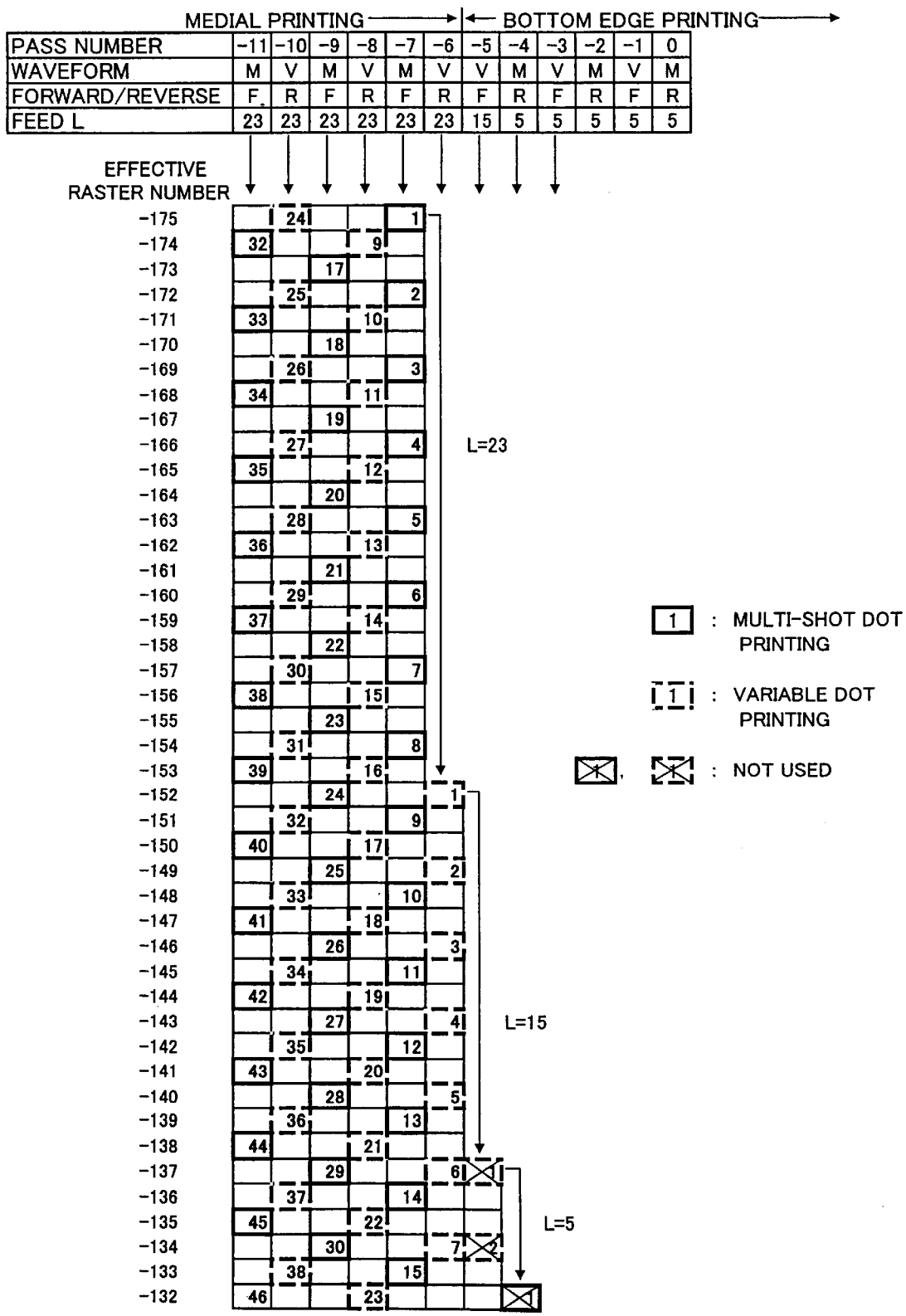
FIGS. 21 and 22 shows scanning parameters for bottom edge printing in the embodiment and the nozzles employed for printing each raster line during each pass.
Figure 22:
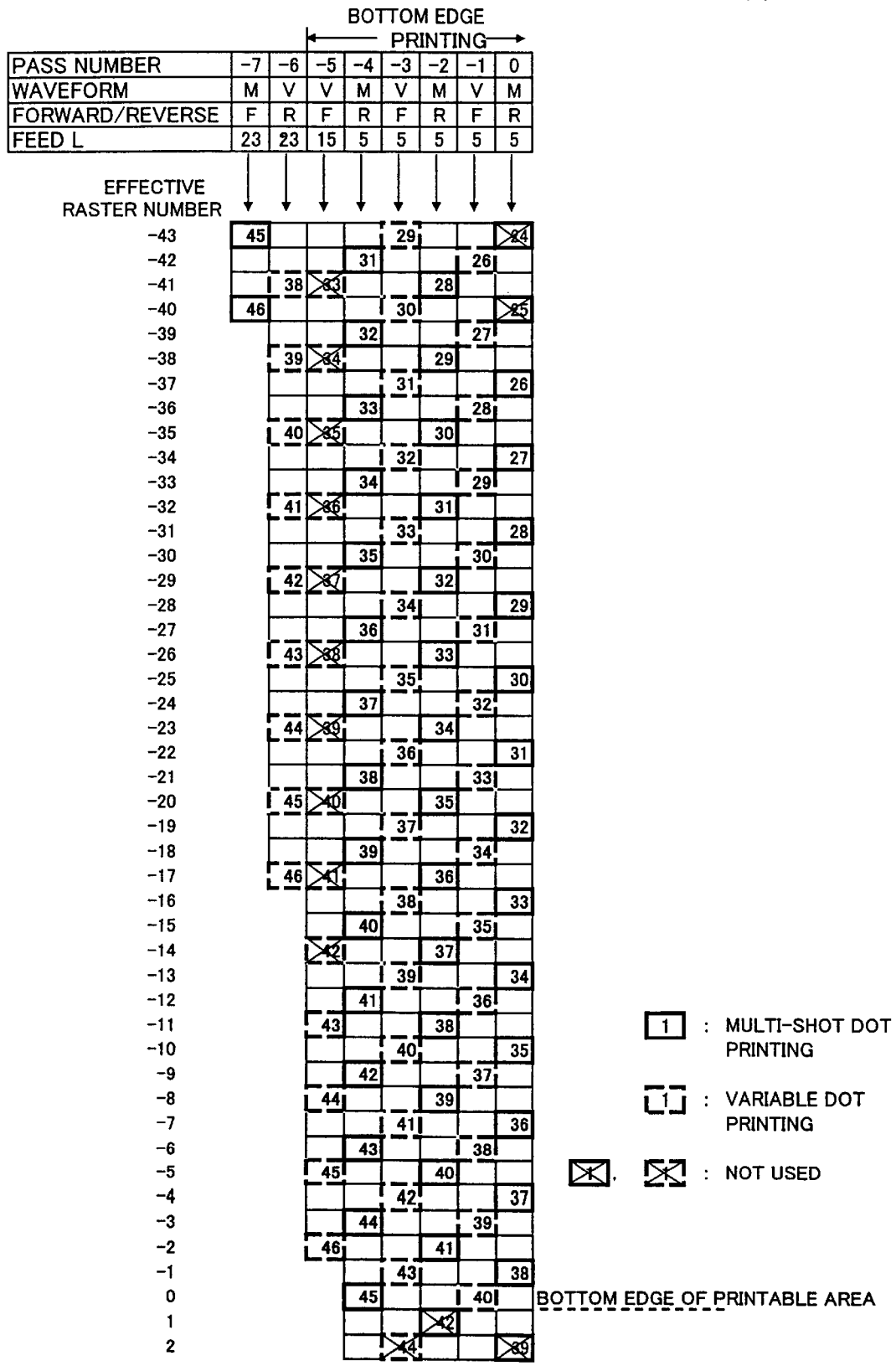

FIGS. 21 and 22 show scanning parameters for bottom edge printing in the embodiment and the nozzles employed for printing each raster line during each pass. In the tables given in FIGS. 21 and 22, pass 0 represents the final main scan. Thus, pass −11, for example, represents the eleventh-to-last pass before final pass 0. Pass −5 through pass 0 represent the six passes constituting bottom edge printing. In pass −5, the initial pass in bottom edge printing, the sub-scan feed L is 15 dot-pitches, but sub-scan feed L assumes a constant value of 5 dot-pitches from pass −4 through pass 0. In the initial pass in bottom edge printing (pass −5), the variable dot drive signal waveform is used in the forward pass, and the variable dot drive signal waveform is also used in the forward pass during the medial printing pass just preceding (pass −6) as well. Accordingly, a reverse pass during which no dots are printed is inserted between these two passes.

In FIG. 22, the raster line denoted by raster number 0 is the raster line situated at the bottom edge of the printable area. The negative raster numbers assigned to the other raster lines represent the number of the raster line counting from the bottom edge raster line. In bottom edge printing as well, drive signal waveform and the nozzles to be actuated are selected on a per-pass basis. As a result, each raster line can be printed with a combination of the multi-shot dot series and the variable dot series. By performing bottom edge printing in this way it is possible to expand the effective printable range.

As will be apparent from the preceding description, according to the present embodiment, drive signal waveform for each pass during top edge and bottom edge printing is selected in such a way that each raster line is serviced at least once with each of the two drive signal waveforms. In this way, it is possible to effect printing on the raster lines, which are printed by top edge or bottom edge printing, using a combination of the multi-shot dot series and the variable dot series, in the same manner as the raster lines that are printed by medial printing alone, thereby achieving high print quality.

Figure 23:
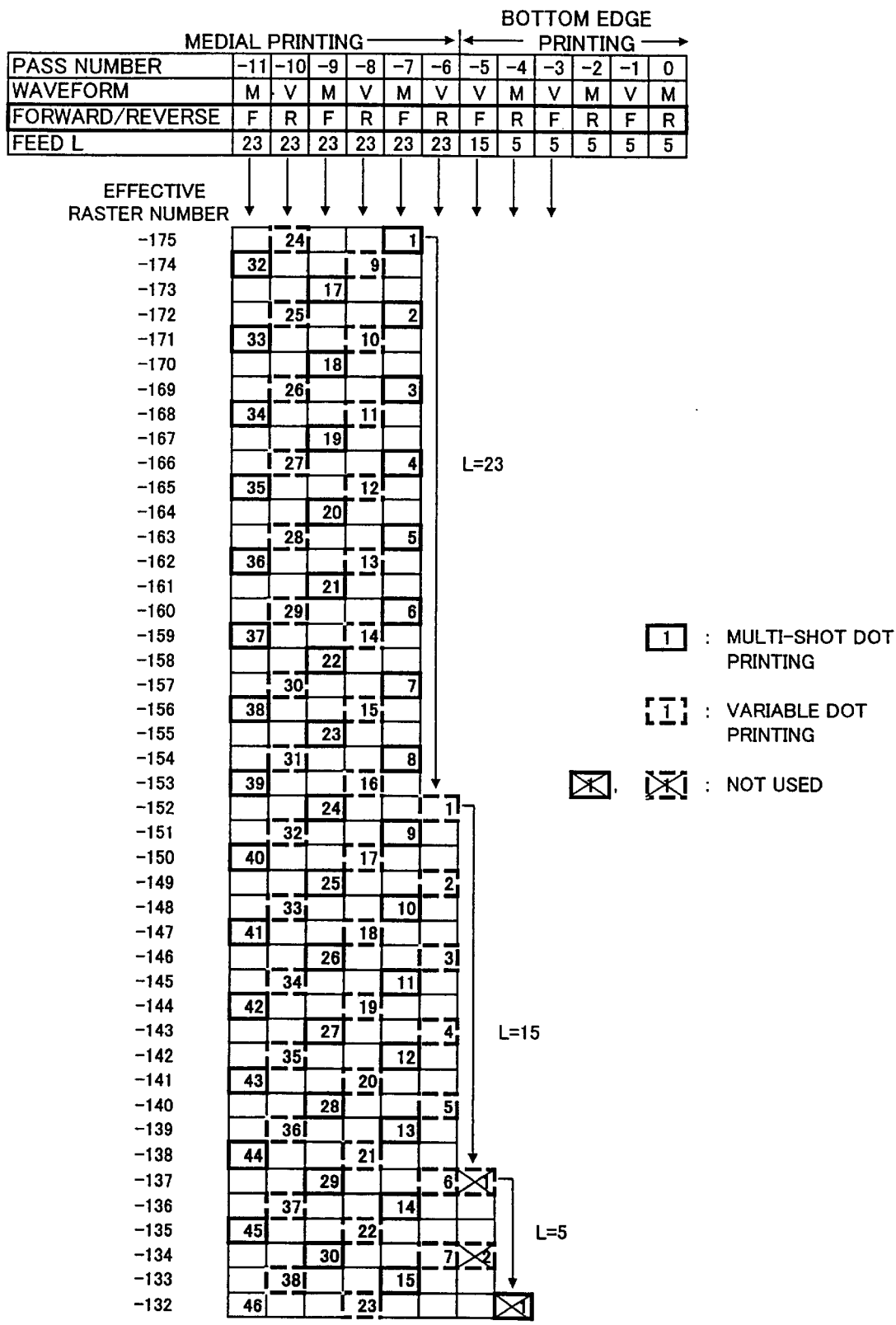
FIGS. 23 and 24 show scanning parameters for a modified version of bottom edge printing in the present embodiment and the nozzles employed for printing each raster line during each pass.
Figure 24:
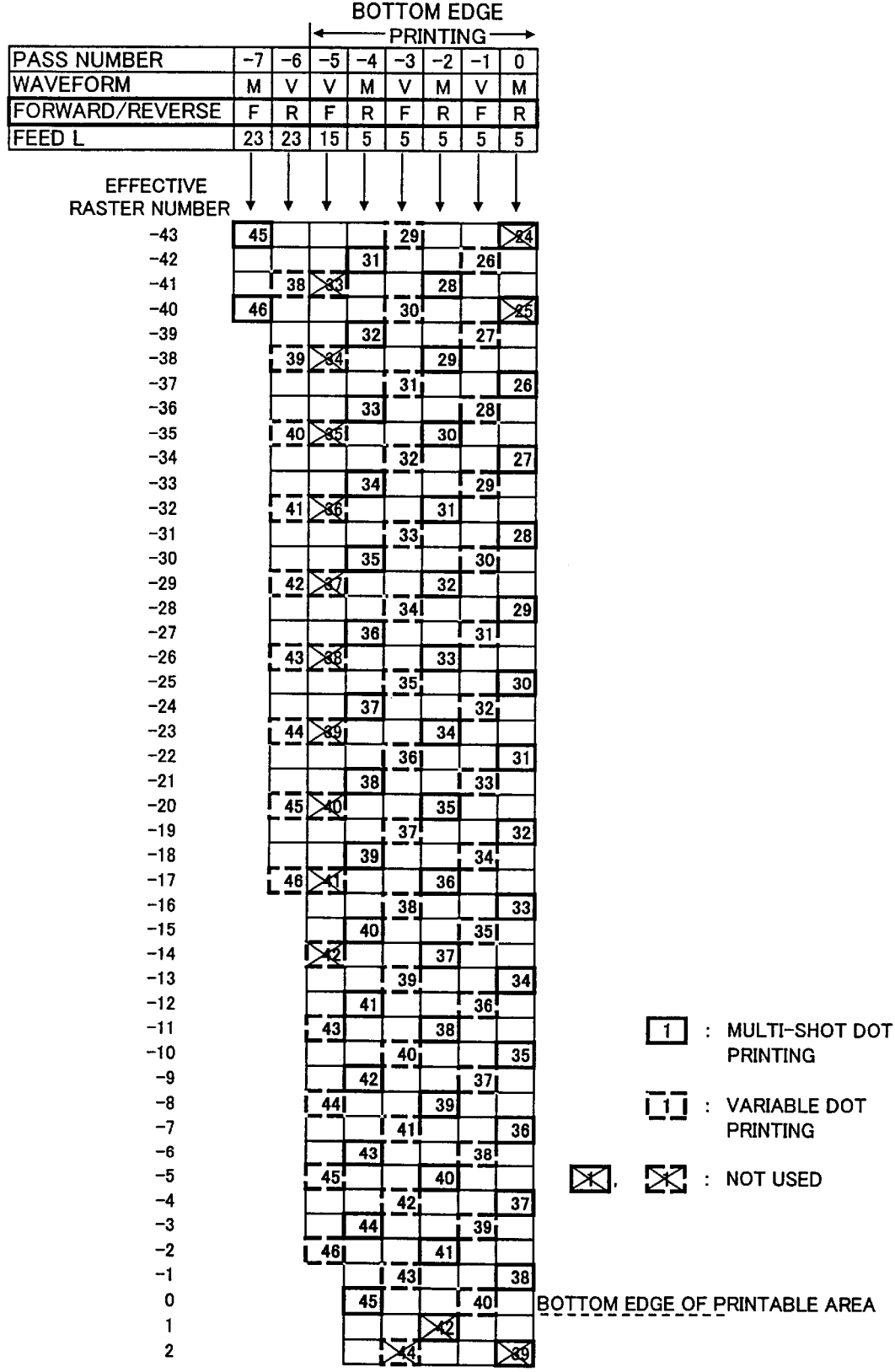

FIGS. 23 and 24 depict a modification of bottom edge printing in the present embodiment. The bottom edge printing depicted in FIG. 24 differs from that depicted in FIGS. 21 and 22 simply in terms of the forward pass and reverse pass assignments. Specifically, during the passes of the bottom edge printing (pass −5 through pass 0), the variable dot series is used in the forward pass and the multi-shot dot series is used in the reverse pass. Accordingly, main scan speed in the forward pass is 200 cps, which is suitable for the variable dot series, and in the reverse pass it is 250 cps, which is suitable for the multi-shot dot series.

In this modification, the final pass of medial printing takes place in the reverse pass, and the initial pass of bottom edge printing takes place in the forward pass. Accordingly, there is no need to insert an additional non-printing pass between these two passes. The speed of bottom edge printing is thus improved somewhat relative to that depicted in FIGS. 21 and 22. Typically, by reversing the forward/reverse directions of the main scan passes for the respective drive signal waveforms during medial printing relative to those during bottom edge (or top edge) printing, the speed of bottom edge (or top edge) printing may be improved somewhat relative to the case where these are not reversed. In other words, performing each main scan at a main scanning speed appropriate to the maskable drive signal selected for each of the forward and reverse passes gives a higher degree of freedom in terms of using the maskable drive signals, thereby effecting better printing.

F. Other Modification Examples

F1. Modification Example 1

The preceding embodiment describes the use of both top edge printing and bottom edge printing; however, it would be possible to use one or other alone as needed.

F2. Modification Example 1

In the preceding embodiment, printing is performed in two directions; however, the present invention is applicable to unidirectional printing as well. In this case, both the multi-shot dot series and the variable dot series would be printed in the forward pass.

F3. Modification Example 3

In the preceding embodiment, two maskable drive signals, one for multi-shot dots and one for variable dots, were used concomitantly; however, it is generally possible to effect printing of a page using an arbitrary number n (where n is an integer equal to 2 or greater) of maskable drive signals. Main scanning speed may be set a level appropriate for each maskable drive signal. Where main scanning speed may assume any of a number of different values, various maskable drive signal waveforms can be used to enable printing with various sets of dot series.

In the preceding embodiment, printing of each raster line is completed in two scan passes, one using the multi-shot dot drive signal waveform and one using the variable dot drive signal waveform. It would, however, be possible to complete printing of each raster line by means of m (where m is an integer equal to 1 or greater) main scan passes using each drive signal waveform m times. Generally, printing on each raster line may be completed in n×m main scan passes using each of n maskable drive signals m times (where n is an integer equal to 2 or greater, and m is an integer equal to 1 or greater). For the raster lines which are printed by bottom edge printing or top edge printing, printing on each raster line may be completed in at least n×m main scan passes using each of n maskable drive signals at least m times.

If m is equal to 2 or greater, each of the m main scan passes performed on a given raster line using a given maskable drive signal will preferably target for printing one of every m intermediate pixel locations.

F4. Modification Example 4

The present invention may be implemented in a drum scan printer as well. In a drum scan printer, the direction of drum rotation is the main scanning direction and the direction of carriage travel is the sub-scanning direction. The present invention is applicable not only to ink-jet printers specifically, but more generally to any types of printing devices wherein the surface of a printing medium is printed with a print head having a plurality of nozzles. Such printing devices include inter alia facsimile devices and copying devices.

F5. Modification Example 5

Some of the elements implemented through hardware in the preceding embodiment may be alternatively implemented through software, and, conversely, some of the elements implemented through software may be replaced by hardware. For example, some of the functions of the system controlled 54 (FIG. 2) could be executed by the host computer 100.

A computer program for executing these functions may be provided in the form of a computer-readable storage medium such as a floppy disk or CD-ROM. The host computer 100 will then read the computer program from the storage medium and transfer it to an internal memory device or external memory device. Alternatively, the computer program may be provided to the host computer 100 from a program provider device via a communications link. The functions of the computer program will be executed by the microprocessor of the host computer 100 on the basis of the computer program stored in an internal memory device. Alternatively, the computer program may be executed directly from the storage medium by the host computer 100.

As used herein, host computer 100 includes both hardware devices and an operating system, and refers to hardware devices operated under the control of the operating system. The functions of the various components of the host computer 100 are executed on the basis of the computer program. Some of the above-described functions may be provided via the operating system, rather than applications.

As used herein, "computer-readable storage medium" is not limited to portable storage media such as flexible disks and CD-ROMs, but includes internal storage devices such as RAM or ROM installed within the computer, or external storage devices such as a hard disk fixed in the computer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing apparatus for printing ink dots on a print medium during main scan passes, comprising:

a print head having a plurality of nozzles and a plurality of ink-expulsion drive elements for jetting ink droplets from each of the plurality of nozzles;

a main scan driver for performing main scan by moving at least one of the printing medium and the print head;

a sub-scan driver for performing sub-scan feed by moving one of the printing medium and the print head;

a head driver for presenting a drive signal to each of the ink-expulsion drive elements in response to a print signal; and a controller for controlling printing operations, wherein the head driver includes:

a maskable drive signal generator capable of selectively generating for each main scan pass any of n types of maskable drive signals where n is an integer equal to 2 or greater; and a drive signal masking section that generates the drive signal to be supplied to the ink-expulsion drive elements, by masking the maskable drive signal according to the print signal on a per-pixel basis;

and wherein the controller executes printing, on at least a part of the print medium, according to a specific printing scheme wherein printing ink dots on each raster line is completed in plural main scan passes while employing each of the n types of maskable drive signals on each raster line while continuously using one of the n types of maskable drive signals throughout one main scan pass.

2. A printing apparatus according to claim 1, wherein at least one of the n types of maskable drive signals can effect printing at a print resolution different from that produced by other maskable drive signals when used alone for printing; and when a printing operation is performed using the n types of maskable drive signals, the printing of ink dots and the sub-scan feed are carried at in units of pixel pitches conforming to a lowest print resolution of the print resolutions achievable by the respective n types of maskable drive signals.

3. A printing apparatus according to claim 2, wherein the print head is capable of producing a plurality of dot types of different size for at least one ink color on a print medium using the nozzles;

the print signal contains multiple bits per pixel so as to allow each pixel to be printed in multi tones;

each of the n types of maskable drive signals includes a plurality of pulses during each pixel interval; and the drive signal masking section masks the maskable drive signals responsive to the multiple-bit print signal.

4. A printing apparatus according to claim 2, wherein the printing apparatus can perform bi-directional printing where the printing of ink dots takes place in both forward and reverse passes; and different maskable drive signals are selected for the forward pass and the reverse pass of main scan.

5. A printing apparatus according to claim 2, wherein the printing apparatus can perform bi-directional printing where the printing of ink dots takes place in both forward and reverse passes;

one of the n types of maskable drive signals is selected for each main scan pass; and the main scan driver performs each main scan at a speed appropriate to the selected maskable drive signal.

6. A printing apparatus according to claim 1, wherein the main scan driver, when conducting main scan passes using at least one specific maskable drive signal from among the n types of maskable drive signals, conducts the main scan at a speed different from that of main scan conducted using other maskable drive signals.

7. A printing apparatus according to claim 6, wherein at least one of the n types of maskable drive signals can effect printing at a print resolution different from that produced by other maskable drive signals when used alone for printing; and when a printing operation is performed using the n types of maskable drive signals, the printing of ink dots and the sub-scan feed are carried at in units of pixel pitches conforming to a lowest print resolution of the print resolutions achievable by the respective n types of maskable drive signals.

8. A printing apparatus according to claim 6, wherein the print head is capable of producing a plurality of dot types of different size for at least one ink color on a print medium using the nozzles;

the print signal contains multiple bits per pixel so as to allow each pixel to be printed in multi tones;

each of the n types of maskable drive signals includes a plurality of pulses during each pixel interval; and the drive signal masking section masks the maskable drive signals responsive to the multiple-bit print signal.

9. A printing apparatus according to claim 6, wherein the printing apparatus can perform bi-directional printing where the printing of ink dots takes place in both forward and reverse passes; and different maskable drive signals are selected for the forward pass and the reverse pass of main scan.

10. A printing apparatus according to claim 6, wherein the printing apparatus can perform bi-directional printing where the printing of ink dots takes place in both forward and reverse passes;

one of the n types of maskable drive signals is selected for each main scan pass; and the main scan driver performs each main scan at a speed appropriate to the selected maskable drive signal.

11. A printing apparatus according to claim 1, wherein the controller executes printing according to a first printing scheme in a medial section of a printable area of the print medium, and while in at least one of a leading edge portion and trailing edge portion of the printable area, executes printing according to a second printing scheme whose amount of the sub-scan feed is smaller than in the first printing scheme;

wherein the controller, with respect to raster lines printed according to the first printing scheme alone, completes printing in the n×m main scan passes employing each of the n types of maskable drive signals m times;

and wherein the controller, with respect to raster lines printed according to both the first printing scheme and the second printing scheme, selects the maskable drive signal for each main scan pass according to the second printing scheme such at least n×m main scan passes are performed employing each of the n types of maskable drive signals at least m times on each of the raster lines.

12. A printing apparatus according to claim 11, wherein at least one of the n types of maskable drive signals can effect printing at a print resolution different from that produced by other maskable drive signals when used alone for printing; and when a printing operation is performed using the n types of maskable drive signals, the printing of ink dots and the sub-scan feed are carried at in units of pixel pitches conforming to a lowest print resolution of the print resolutions achievable by the respective n types of maskable drive signals.

13. A printing apparatus according to claim 11, wherein the print head is capable of producing a plurality of dot types of different size for at least one ink color on a print medium using the nozzles;

the print signal contains multiple bits per pixel so as to allow each pixel to be printed in multi tones;

each of the n types of maskable drive signals includes a plurality of pulses during each pixel interval; and the drive signal masking section masks the maskable drive signals responsive to the multiple-bit print signal.

14. A printing apparatus according to claim 11, wherein the printing apparatus can perform bi-directional printing where the printing of ink dots takes place in both forward and reverse passes; and different maskable drive signals are selected for the forward pass and the reverse pass of main scan.

15. A printing apparatus according to claim 11, wherein the printing apparatus can perform bi-directional printing where the printing of ink dots takes place in both forward and reverse passes;

one of the n types of maskable drive signals is selected for each main scan pass; and the main scan driver performs each main scan at a speed appropriate to the selected maskable drive signal.

16. In a printing apparatus comprising a print head having a plurality of nozzles and a plurality of ink-expulsion drive elements for expelling ink droplets from each of the plurality of nozzles, and a head driver for masking a maskable drive signal to produce a drive signal to be supplied to each of the ink-expulsion drive elements, a printing method comprising the steps of:

executing printing, on at least a part of the print medium, according to a specific printing scheme wherein printing ink dots on each raster line is completed in plural main scan passes while employing each of n types of maskable drive signals on each raster line while continuously using one of the n types of maskable drive signals throughout one main scan pass, where n is an integer equal to 2 or greater.

17. A printing method according to claim 16, wherein at least one of the n types of maskable drive signals can effect printing at a print resolution different from that produced by other maskable drive signals when used alone for printing; and when a printing operation is performed using the n types of maskable drive signals, the printing of ink dots and the sub-scan feed are carried at in units of pixel pitches conforming to a lowest print resolution of the print resolutions achievable by the respective n types of maskable drive signals.

18. A printing method according to claim 17, wherein the print head is capable of producing a plurality of dot types of different size for at least one ink color on a print medium using the nozzles;

the print signal contains multiple bits per pixel so as to allow each pixel to be printed in multi tones;

each of the n types of maskable drive signals includes a plurality of pulses during each pixel interval; and the maskable drive signals is masked responsive to the multiple-bit print signal.

19. A printing method according to claim 17, wherein the printing is performed bi-directionally where the printing of ink dots takes place in both forward and reverse passes; and different maskable drive signals are selected for the forward pass and the reverse pass of main scan.

20. A printing method according to claim 17, wherein the printing is performed bi-directionally where the printing of ink dots takes place in both forward and reverse passes;

one of the n types of maskable drive signals is selected for each main scan pass; and each main scan pass is performed at a speed appropriate to the selected maskable drive signal.

21. A printing method according to claim 16, wherein when main scan passes are conducted using at least one specific maskable drive signal selected from among the n types of maskable drive signals, the main scan is performed at a speed different from that of main scan conducted using other maskable drive signals.

22. A printing method according to claim 21, wherein at least one of the n types of maskable drive signals can effect printing at a print resolution different from that produced by other maskable drive signals when used alone for printing; and when a printing operation is performed using the n types of maskable drive signals, the printing of ink dots and the sub-scan feed are carried at in units of pixel pitches conforming to a lowest print resolution of the print resolutions achievable by the respective n types of maskable drive signals.

23. A printing method according to claim 21, wherein the print head is capable of producing a plurality of dot types of different size for at least one ink color on a print medium using the nozzles;

the print signal contains multiple bits per pixel so as to allow each pixel to be printed in multi tones;

each of the n types of maskable drive signals includes a plurality of pulses during each pixel interval; and the maskable drive signals is masked responsive to the multiple-bit print signal.

24. A printing method according to claim 21, wherein the printing is performed bi-directionally where the printing of ink dots takes place in forward and reverse passes; and different maskable drive signals are selected for the forward pass and the reverse pass of main scan.

25. A printing method according to claim 21, wherein the printing is performed bi-directionally where the printing of ink dots takes place in both forward and reverse passes;

one of the n types of maskable drive signals is selected for each main scan pass; and each main scan pass is performed at a speed appropriate to the selected maskable drive signal.

26. A printing method according to claim 16, wherein the printing is executed according to a first printing scheme in a medial section of a printable area of the print medium, and while in at least one of a leading edge portion and trailing edge portion of the printable area, the printing is executed according to a second printing scheme whose amount of the sub-scan feed is smaller than in the first printing scheme;

with respect to raster lines printed according to the first printing scheme alone, the printing of ink dots is completed in the n×m main scan passes employing each of the n types of maskable drive signals m times;

and with respect to raster lines printed according to both the first printing scheme and the second printing scheme, the maskable drive signal is selected for each main scan pass according to the second printing scheme such that at least n×m main scan passes are performed employing each of the n types of maskable drive signals at least m times on each of the raster lines.

27. A printing method according to claim 26, wherein at least one of the n types of maskable drive signals can effect printing at a print resolution different from that produced by other maskable drive signals when used alone for printing; and when a printing operation is performed using the n types of maskable drive signals, the printing of ink dots and the sub-scan feed are carried at in units of pixel pitches conforming to a lowest print resolution of the print resolutions achievable by the respective n types of maskable drive signals.

28. A printing method according to claim 26, wherein the print head is capable of producing a plurality of dot types of different size for at least one ink color on a print medium using the nozzles;

the print signal contains multiple bits per pixel so as to allow each pixel to be printed in multi tones;

each of the n types of maskable drive signals includes a plurality of pulses during each pixel interval; and the maskable drive signals is masked responsive to the multiple-bit print signal.

29. A printing method according to claim 26, wherein the printing is performed bi-directionally where the printing of ink dots takes place in both forward and reverse passes; and different maskable drive signals are selected for the forward pass and the reverse pass of main scan.

30. A printing method according to claim 26, wherein the printing is performed bi-directionally where the printing of ink dots takes place in both forward and reverse passes;

one of the n types of maskable drive signals is selected for each main scan pass; and each main scan pass is performed at a speed appropriate to the selected maskable drive signal.

\* \* \* \* \*